United States Patent
Moench et al.

(10) Patent No.: US 8,751,707 B2
(45) Date of Patent: Jun. 10, 2014

(54) CONNECTING MODULE FOR CONNECTING AT LEAST ONE SENSOR, ACTUATOR, OR EFFECTOR TO A SERVICE-ORIENTED-ARCHITECTURE NETWORK

(75) Inventors: Egon Moench, Remchingen (DE); Rainer Klotz, Bretzfeld (DE); Jeremy Michel, Pforzheim (DE); Christoph Prasse, Illingen (DE); Wolfgang Schmidt, Jever (DE)

(73) Assignee: Thales Defence Deutschland GmbH (DE)

( * ) Notice: Subject to any disclaimer, the term of this patent is extended or adjusted under 35 U.S.C. 154(b) by 0 days.

(21) Appl. No.: 13/522,849

(22) PCT Filed: Dec. 18, 2010

(86) PCT No.: PCT/EP2010/007768
§ 371 (c)(1),
(2), (4) Date: Jul. 18, 2012

(87) PCT Pub. No.: WO2011/088878
PCT Pub. Date: Jul. 28, 2011

(65) Prior Publication Data
US 2012/0290749 A1    Nov. 15, 2012

(30) Foreign Application Priority Data
Jan. 19, 2010   (DE) .......................... 10 2010 005 658

(51) Int. Cl.
*G06F 13/12* (2006.01)
*G06F 13/38* (2006.01)

(52) U.S. Cl.
USPC ........................................... 710/63; 717/171

(58) Field of Classification Search
None
See application file for complete search history.

(56) References Cited

U.S. PATENT DOCUMENTS

| 7,926,093 B2 * | 4/2011 | Eibach et al. ...................... 726/6 |
| 8,255,972 B2 * | 8/2012 | Azagury et al. .................. 726/1 |

(Continued)

FOREIGN PATENT DOCUMENTS

| EP | 1548983 A1 | 6/2005 |
| JP | 2007280030 A | 10/2007 |

OTHER PUBLICATIONS

Song E.Y. et al., "Service-Oriented Sensor Data Interoperability for IEEE 1451 Smart Transducers", Instrumentation and Measurement Technology Conference, 2009, I2MTC '09. IEEE, Digital Object Identifier: 10.1109/IMTC.2009.5168607, Publication Year 2009, pp. 1043-1048, URL: http://ieeexplore.ieee.org/stamp/stamp.jsp?tp=&arnumber=5168607.

(Continued)

*Primary Examiner* — Elias Mamo
(74) *Attorney, Agent, or Firm* — Donald R. Boys; Central Coast Patent Agency, Inc.

(57) ABSTRACT

The invention relates to a connecting module (3) for connecting at least one sensor (2), effector, or actuator to a service-oriented-architecture, called SOA, network (4), wherein a functionality of the at least one sensor (2) is mapped as a service in the SOA network (4). In order to enable the integration of sensors (2) that are not SOA-capable in themselves into an SOA environment, the connecting module (3) has at least one first interface (3.2) for connecting the at least one sensor (2), effector, or actuator, at least one second interface (3.4) for connecting the SOA network (4), and a computing device (7) for executing a computer program, wherein a part (8.1) of the computer program to be executed is specified by default and another part (8.2) of the computer program is freely programmable by a manufacturer of the at least one sensor (2) in order to adapt firmware on the at least one sensor (2) to the SOA environment. The invention further relates to a module unit (22) of the connecting module (3) that prepares the service mapped in the SOA environment for transmission over a military radio network (35) having low bandwidth while maintaining the SOA functionality.

18 Claims, 10 Drawing Sheets

(56) References Cited

U.S. PATENT DOCUMENTS

| | | | |
|---|---|---|---|
| 2003/0037108 A1* | 2/2003 | Peiffer et al. | 709/203 |
| 2006/0282886 A1 | 12/2006 | Gaug | |
| 2007/0069896 A1 | 3/2007 | Boland et al. | |
| 2007/0236346 A1* | 10/2007 | Helal et al. | 340/539.22 |
| 2008/0165456 A1* | 7/2008 | Ganev et al. | 361/23 |
| 2009/0089065 A1* | 4/2009 | Buck et al. | 704/275 |
| 2009/0328027 A1* | 12/2009 | Tsuchiya et al. | 717/171 |
| 2011/0125776 A1* | 5/2011 | Roshen et al. | 707/769 |
| 2011/0125821 A1* | 5/2011 | Roshen | 709/201 |

OTHER PUBLICATIONS

Xingchen C et al., "Open Sensor Web Architecture: Core Services", Intelligent Sensing and Information Processing, 2006. ICISIP 2006. Fourth International Conference on Digital Object Identifier: 10.1109/ICISIP.2006.4286069, Publication Year: 2006, pp. 98-103, URL: http://ieeexplore.ieee.org/stamp/stamp.jsp?tp=&arnumber=4286069.

Gilart-Iglesias Virgilio et al., "Normalization of Industrial Machinery with Embedded Devices and SOA", Emerging Technologies and Factory Automation, 2006. ETFA '06. IEE E Conference on, IEEE, PI, Sep. 1, 2006, Seiten 173-180, XP031082637, ISBN: 978-0-7803-9758-3, Seite 177, linke Spalte, Zeile 1—Seite 179, rechte Spalt, Zeile 55.

Mauro C et al., "Standardized Device Services—A Design Pattern for Service Oriented Integration of Medical Devices", System Sciences (HICSS), 2010 43rd Hawaii International Conference on, IEEE, Piscataway, NJ, USA, Jan. 5, 2010, Seiten 1-10, XP031646952, ISBN: 978-1-4244-5509-6.

\* cited by examiner

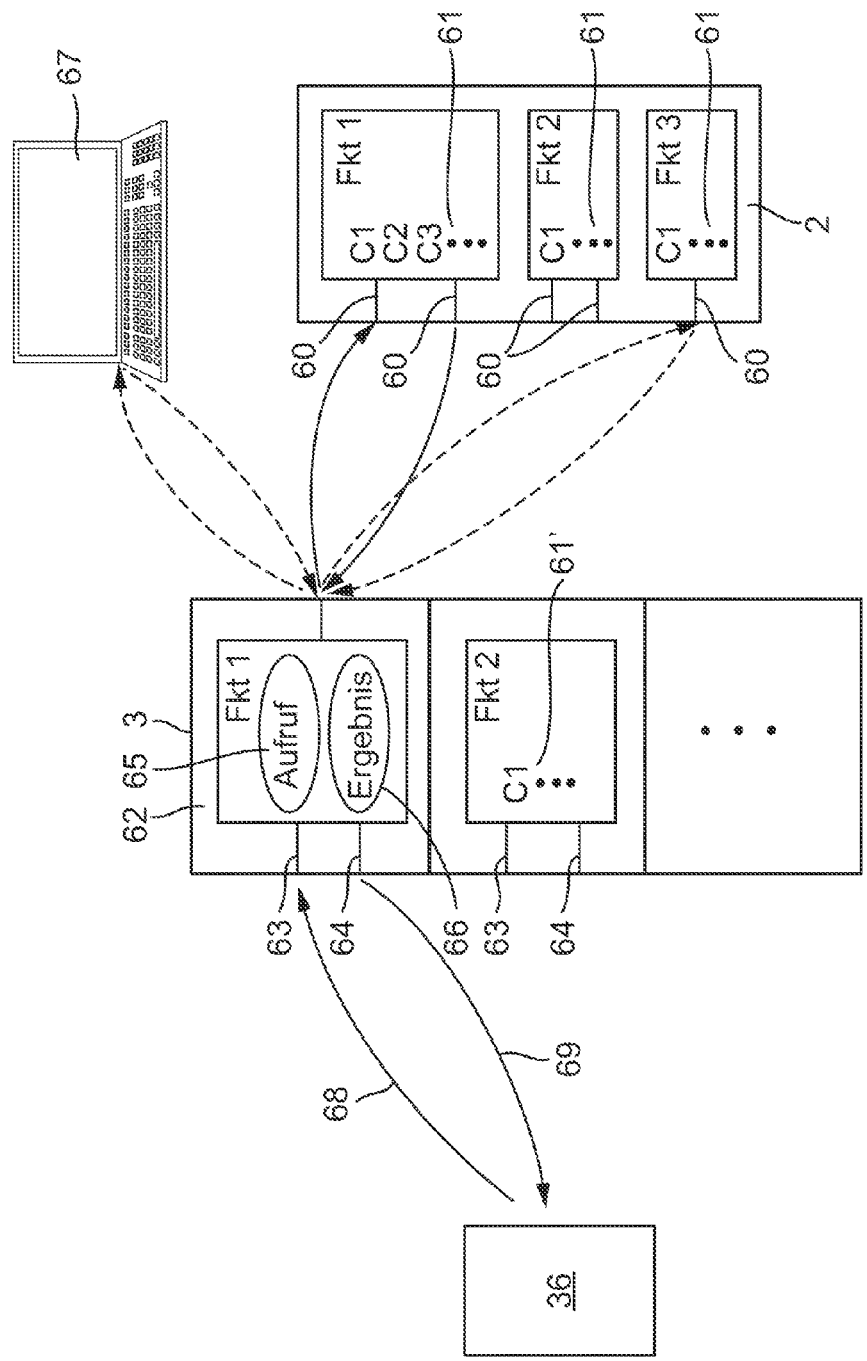

CONNECTING MODULE FOR CONNECTING AT LEAST ONE SENSOR, ACTUATOR, OR EFFECTOR TO A SERVICE-ORIENTED-ARCHITECTURE NETWORK

The present application claims priority to German application 10 2010 005 658.8, filed Jan. 19, 2010, which is incorporated herein in its entirety, at least by reference.

The present invention is based on a service-oriented architecture (SOA) network. SOA extends the concept of web services to an architecture for comprehensive and service-based applications, where existing systems and applications that are involved are speeded up by using new functionalities. The prior art discloses SOA for the widest variety of applications. SOA is an information technology (IT) architecture with flexible software units (what are known as services) as a central concept. When the SOA concept is used for business applications, services implement or support business functions and are oriented thereto. They are independently and loosely coupled and usually exhibit a physical distribution (for example cf. US 2009/0281861 A1). The SOA concept is also known in the field of telemedicine (for example cf. US 2009/0254362 A1).

Finally, the SOA concept is also increasingly being used in the field of security and defense engineering (cf. EP 2 112 624 A1). In this case, sensors integrated in an SOA network may be in the form of cameras for capturing a defined physical region, in the form of geophones for detecting tremors or in the form of any other sensors which provide information about a physical area that is to be monitored, an emergency vehicle that is to be monitored or the like, for example. Effectors integrated in an SOA network may be in the form of arbitrary weapons systems, for example guns on a tank, or else in the form of jamming transmitters, smoke mortars or the like. Actuators integrated in an SOA network may be in the form of arbitrary elements which convert an input variable into an output variable of a different kind in order to bring about a desired action or an effect. In particular, an actuator may be in the form of an electric motor, an electromagnet or an arbitrary drive system. In order to be able to connect the sensors, effectors or actuators to the SOA network and integrate them into the SOA concept, they need to have SOA capability. The explanations which follow refer only to sensors, for the sake of simplicity. However, the explanations also apply accordingly to effectors, actuators and any other participants in an SOA network.

The text below provides a more detailed discussion of the principle of what is known as networked operational management (operational framework). The spectrum of tasks and the capability profile derived therefrom for the security agencies, particularly national armed forces, such as the Federal Armed Forces in Germany, or multinational armed forces (e.g. NATO), are determined by the political security and defense guidelines and also the international obligations of the respective nation of the multinational coalition. In order to achieve a sustainable improvement in operational capability in the prescribed spectrum of tasks with consistent concentration on the core capabilities, a transformation process is increasingly being introduced, by means of which, in light of the operations spanning sections of armed forces and multinational operations and the resultant interoperability demands, visions and approaches are shifting ever closer to the focus of conceptual discussions under the heading of networked operational management (NetOpFü).

In specific terms, NetOpFü means that a comprehensive information complex "management, reconnaissance, action including operational support" needs to be provided which extends vertically over all management levels and horizontally over all functional task areas in order to supply all those involved, ranging from individual soldiers through the military management levels, the support instances to the political discussion levels, with the important information in each case. Since the armed forces comprise a multiplicity of elements which need to be brought to bear in a joint operation, synergistic effects can arise only if the elements or units involved act not as individuals but rather as part of a whole.

The improvement in the information quality and in the information exchange, attributable to the capability of capturing, evaluating, compressing, providing and protecting information in its entirety, forms the basis for an effective and efficient management process.

A fundamental prerequisite for this effective information complex and the associated dominance in the information space is the consistent application of modern information technology. However, still more compelling are the network capability of the individual elements and the interoperability among one another but also with the information systems of other sections of armed forces (e.g. army, air force, navy), with the systems of partnering nations and with the civil and military departments. A communication infrastructure which is free of media disruption and which provides the superordinate information services with adequate transport services in the widest variety of forms and qualities ensures realtime information exchange which combines the previously largely separate and differently structured information in one information complex.

The text below provides a more detailed discussion of the principle of service-oriented architecture (architectural framework). Interoperability is the key to commonality among armed forces, multinationality and flexibility. It is a comprehensive bracket around all categories of capability. Within NATO and also nationally, the use of the "Architecture" method is prescribed, which is intended to ensure that the interoperability requirements regarding engineering, process and methodology can be met. An advantage of the service-oriented architecture principle (SOA) is the opportunity to reuse functionalities once implemented as what are known as services with little involvement and to provide them for other systems for use. A service-oriented architecture is, as the name already suggests, a service-based architecture for a software landscape, ideally implemented using web services.

The SOA principle is explained in more detail below using the example of implementation in business processes. Instead of assigning a fixed, monolithic IT (Information Technology) solution to a particular subprocess, SOA works with smaller units. The individual, reusable business services are loosely coupled and are configured according to the business process. One can imagine this as a normal purchase operation: A particular business process (service consumer) purchases the combination it requires from a pool of individual services (service providers) and in this way obtains more or less bespoke IT support. A prerequisite is a precise definition of the individual business services (service agreement).

The great advantage of the SOA concept is that in the event of changes in the business process it is not immediately necessary to invest in a new IT solution, but rather only the combination of services needs to be customized. This makes companies more versatile and more flexible on a whole and in this way provides them with an edge over competitors. Users think it important precisely that they are able to react quickly to seasonal conditions such as peak demand or altered customer requirements as a result of the flexible handling of business processes and are also able to support their growth in the long term as a result of a future-oriented architecture. When considered in their entirety, flexibility and reusability and also the opportunity for orchestration, i.e. the flexible combination of services, are in the foreground.

However, it must be conceded that the technological implementation in this regard is currently still in its infancy. The main issue, however, is that the business targets and IT strategy of a company shift closer together as a result of SOA. SOA helps provide users with continual optimization of their business processes, with innovation and higher efficiency. In order to actually achieve this, however, it is essential that the relevant processes are defined precisely and that the reusability of the services is ensured.

The text below provides a more detailed discussion of the principle of networked operational management (NetOpFü) in combination with SOA. In the civilian world of business, service-oriented architectures (SOA) as an infrastructure for business processes and the management thereof are critical for the economic success and competitiveness of companies. The focus of service-oriented architectures is on process standardization, automation and improvement, on the one hand, and flexibility attributable to the dynamics of the markets and of customer requirements, on the other hand.

On the basis of the notional synonymity of the terms "competitiveness" and "superiority of action" and the analogy of the process factors and the flexibility attributable to the dynamics of operations, it follows that a service-oriented architecture (SOA) as an infrastructure for the mission-based military processes and scenarios and the management thereof can be critical for the superiority of action and the success of the operation. In the case of this parallelization of the civilian and military worlds, a quite crucial aspect needs to be considered, however. The organizational and structural categorizations into static, transferable and mobile realms are by a long way not as pronounced in the civilian world of business as in military operational scenarios and therefore need to have allowances made for them at the design stage.

For the conceptual and intellectual continuation of the SOA design, however, it should be taken into account that the technological parallelism has existed to date essentially only between the civilian world and the static realm.

In relation to the transmission of information, powerful and above all interoperable communication systems are of crucial importance for the desired information complex. Whereas the transmission of information by large organizations needs to be based on a powerful wide area network which can sometimes extend as far as the battalion level on account of the spaciousness of the operational area, the local subsystems of the mobile subscribers and vehicles on the lower hierarchy levels need to be involved in the information complex by means of mobile radio systems, said radio systems usually being able to provide only a limited bandwidth in comparison with wide-area networks. This aspect is covered in the architectural considerations by the domain concept, which covers the homogeneity of the entire information complex but at the same time also allows autonomous operation of individual domains.

Interoperability demands exist not only in the realm of information transmission, however. Particularly the demanded support for smaller multinational response forces produces interoperability demands with regard to information sharing (use of the information by multiple participants) and security.

These ambitious operational objectives can be achieved only by flexible, adaptative and highly networked information and communication infrastructures, as may be provided by consistent use of the service-oriented paradigms.

Various known activities have been able to show, over the entire range of military operations, the potential which there is in the application of a service-oriented architecture (SOA), which provides the technical and specialized services and functionalities in the form of loosely coupled services.

The preceding sections have already indicated that the basis for possible implementation of a system supporting SOA-based operations could be solutions from the civilian realm which are already available today. The—from today's point of view—unproblematic integration of these solutions provides a homogenous infrastructural basis for implementing the elaborated design. One critical component in this environment is the tactical realm with its transferable and mobile components, which plays a critical role particularly for the operational scenarios indicated above, however, in order to show the interactions between a service-oriented architecture and the tactical process and to demonstrate the operational benefit of an SOA in relation to optimum behavior within the context of mission tactics.

The development strategy of NetOpFü and NNEC (NATO Network Enabled Capabilities) is based on the necessary operational capabilities being obtained through the symbiosis of independent system capabilities. Individual systems capabilities which have arisen in successive development cycles need to be of modular design/designed in modular fashion so that they can be merged without difficulty to form the NetOpFü overall system capability. The consistent use of a service-oriented approach supports the evolutionary development of NetOpFü by virtue of this approach forcing the capabilities to be concentrated and hence being a solid concept for the development of NetOpFü.

A quite essential aspect which must not be overshadowed in this consideration of the whole picture is the incorporation of the individual system capabilities provided by existing old systems (subsequently called legacy systems). The aptitude for networked operational management on the basis of the service-oriented paradigm presupposes that the system capabilities are available as (web) services and consequently web service compliant interfaces can also be used to access this. This property does not exist, in principle, in the case of legacy systems. Since the German Federal Armed Forces currently have a wide-ranging variety of legacy systems from a wide variety of manufacturers in operational use, however, the introduction of SOA can be expedient only if these legacy systems are also extensively integrated.

Furthermore, the infrastructure components have not yet reached the level of maturity which is required for use in a (highly) mobile operational environment. In this case, the focus is particularly on the functionalities for optimizing the algorithms in operational scenarios in the tactical/mobile and transferable realm with restricted and unstable network conditions. Fundamental mechanisms for the mobile realm in order to meet important military demands—for example mobility or support for a local collaboration process between platforms for coordinated action—need to be integrated into the infrastructure components.

In order to achieve the full scope of functions of a service-oriented NetOpFü aptitude, the system capabilities of existing, non-service-oriented systems need to be encapsulated independently of manufacturer such that access is possible externally by other systems using web service compliant interfaces. To use these system capabilities made available as a service in a (highly) mobile or from a (highly) mobile segment too, the infrastructure also needs to be designed for the special characteristics.

The IEEE publication "Service-Oriented Sensor Data Interoperability for IEEE 1451 Smart Transducers" by Song, Eugene Y., published in May 2009, shows a way of integrating conventional sensors or actuators without SOA capability into an SOA environment by using a suitable connecting module. However, a prerequisite is that the sensors or actuators are associated with a microcontroller and a network interface (a transducer). The publication describes encapsulation of a sensor or actuator in two layers. In a lower layer, a transducer forms an IEEE 1451.x interface. In an upper layer, an IEEE 1451.x communication module which is capable of communicating with the transducer is integrated into an SOA web service.

The IEEE publication "Open Sensor Web Architecture: Core Services" by Chu, Xingchen; Kobialka, Tom; Durnota, Bohdan; and Buyya, Rajkumar, from 2006, describes what is known as an NICTA Open Source Web Architecture (NOSA), which can integrate the conventional sensors or actuators without SOA capability into an SOA environment by using a suitable connecting module. In the case of NOSA, however, no direct connection to the connecting module is set up. NOSA is based on the Sensor Web Enablement (SWE) standard, which was defined by the Open Geospatial Consortium (OGC). SWE is a standard which comprises a requirements profile or specifications for interfaces, protocols and encryptions which allow sensor and actuator data and also sensor processing services to be recognized, accessed and obtained.

A common feature of both known methods for connecting systems without SOA capability to an SOA environment is that they make quite specific demands on the system that is to be incorporated, that is to say they cannot flexibly incorporate any sensors or actuators into the SOA environment.

US 2007/0236346 A1 describes a method for connecting at least one appliance without service capability (e.g. sensor, effector or actuator) to a service-oriented network (OSGI (Open Services Gateway Initiative) architecture). In this case, for each appliance type, the appliance manufacturer individually programs appropriate encapsulation in order to map the appliance in the service-oriented environment. This requires the appliance manufacturer to have knowledge about the service-oriented environment, which it normally does not have and needs to be additionally purchased at great expense.

Furthermore, the individual encapsulation of the appliances is very complex in terms of producing and servicing the encapsulation. Furthermore, the flexibility of the individual encapsulation is very limited. A change to the service bus used (e.g. ESB (Enterprise Service Bus) of Websphere type or of SOPERA type in the current version 3.3 or a more recent or successive version (SOPERA "Swordfish")) immediately necessitates fresh production or at least complex reprogramming of the encapsulation. A similar situation also applies when the encapsulated appliance or the appliance to be encapsulated changes. Finally, the known method can result in incompatibilities arising when appliances which originate from different manufacturers and for which the encapsulation has been implemented by the different manufacturers are connected to a service-oriented network. The reason is that, by way of example, an SOA is not a compulsory standard but rather is merely a recommendation. The result of this can be that, although encapsulations implemented by different manufacturers are all SOA compliant, they are not at all compatible with one another or are compatible only to a restricted degree.

Against the background of the prior art described, the present invention is therefore based on the object of providing a way of allowing sensors which are originally without SOA capability to be integrated into an SOA network structure in as simple and inexpensive a manner as possible.

In order to achieve this object, the present invention proposes the use of a connecting module for connecting at least one appliance to a service-oriented architecture (SOA) network, wherein a functionality of the at least one appliance is mapped as a service in the SOA network. The connecting module has at least one first interface for connecting the at least one appliance and at least one second interface for connecting the SOA network. Furthermore, the connecting module has a computation appliance for executing a computer program, wherein one portion of the computer program that is to be executed is prescribed and another portion of the computer program is freely programmable by a manufacturer of the at least one appliance in order to implement customization of a piece of firmware which is present on the at least one appliance to the SOA network.

The prescribed portion of the computer program is stored in a suitable memory, for example in a ROM, an EEPROM or a flash memory, preferably by the manufacturer of the connecting module before the latter is even delivered to a customer, that is to say preferably during or subsequent to the production at the end of the line. The memory may be integrated in the computation appliance (internal memory) or arranged outside the computation appliance (external memory). Following delivery of the connecting module to the customer (i.e. the manufacturer of the sensor), the latter can then freely program another portion of the computer program and store it in an internal or external memory on the computation appliance. This may be the same memory in which the firmly prescribed portion of the computer program is already stored (but preferably in another memory area), or else it is a separate memory.

The connecting module is also called a Tactical Service Bus Interface (TSBI). The TSBI operates as a connecting module which converts the firmware associated with the individual sensors into SOA compatible standards. The TSBI provides functionalities as services in compliance with the web service standards. Furthermore, the TSBI provides most customary interfaces as hardware interfaces, by means of which the TSBI is connected to the at least one sensor, on the one hand, and to the SOA network, on the other. The interface to the SOA network may be in the form of a radio interface, for example, which is controlled by a digital signal processor (DSP), for example. This makes it possible to achieve largely delay-free data transmission between the TSBI and the SOA network. Preferably, the TSBI provides two types of interface, an SOA interface to the Enterprise Service Bus (ESB) and a radio interface which is implemented by a separate Lightweight Service Bus Node (LSBN) module. The TSBI is therefore able to integrate particularly sensors from the realm of security and defense engineering (what is known as legacy equipment) into an SOA environment. The invention has the advantage that the development of completely new sensors with SOA capability is not necessary. On the contrary, it is possible to use conventional sensors which inherently have no SOA capability, these being provided with generic SOA capability—as mentioned, by means of the TSBI.

The present invention is thus based on the concept of easily and inexpensively conveying SOA capability to one or more sensors of arbitrary design which are inherently without SOA capability by using the largely standardized (apart from that portion of the computer program which is to be programmed by the sensor manufacturer) connecting module in order thus to be able to integrate the sensors into an SOA network structure. The integration of the sensors by means of the connecting module is significantly less expensive, easier and faster than complete redevelopment of the entire sensor with integrated SOA capability. The invention distinctly increases acceptance and hence also the spread of networks with SOA capability in the realm of security, military and defense engineering. This is of particular interest to all types of action forces, such as police, federal border protection, fire brigade, German Federal Agency of Technical Relief, German Federal Armed Forces, medical emergency care, etc.

One important aspect of the present invention can be seen in that generic encapsulation of arbitrary appliances (e.g. sensors, actuators or effectors) is provided, that is to say that it becomes possible to map any appliances which are inherently without SOA capability in an SOA environment. Encapsulation is possible without the manufacturer of the appliance that is to be encapsulated having knowledge concerning the SOA environment and the SOAP (Simple Object Access Protocol).

In particular, the appliance manufacturer does not need to have information regarding what is known as statefulness of the appliances and statelessness of the services and the allowance therefor when consuming the services. Statefulness means that the appliance or the encapsulation stores information about its own state. Statelessness means that the service (i.e. SOA webservice) handles a plurality of requests essentially as mutually independent transactions; no information is stored between queries. If the appliance to be encapsulated is a rotatable weapon, for example, it can be rotated into the desired position by means of a first command and fired by means of a second command. If the service corresponding to the second command were now to be dropped immediately after the first service, this could—in the event of incorrect processing—result in the weapon being fired even before the desired position is reached. This situation is remedied by the TSBI connecting module, for example by virtue of service requests being able to be stored and subjected to coordinated execution. If required, the connecting module can even take account of priorities in SOAP requests and take account of them when executing the commands. To this end, a web service interface (what is known as a request-response module) of the connecting module produces threads from the SOAP requests and caters for the correct order of execution in accordance with the priorities.

The appliance manufacturer also does not need to have any knowledge about web services nor to have information or knowledge about the type of a service bus used (e.g. an Enterprise Service Bus (ESB) of Websphere type, of SOPBERA 3.3 type or of SOPERA "Swordfish" type or of another type or a Lightweight Service Bus (LSB)). The connecting module according to the invention autonomously provides a suitable WSDL (Web-Service Definition Language) file, which is loaded into the registry of the service bus, upon request by the user, depending on the type of service bus used.

One important aspect of the TSBI connecting module is the existence of a heartbeat function. Heartbeats allow knowledge at SOA level of whether an encapsulation is still active and is behaving correctly or is no longer active, for example on account of an error. Heartbeat functions are automatically generated for every new encapsulation. These functions are called automatically from time to time. Every successful automatic call to a heartbeat function triggers a new notification (publish) which can be received at SOA level by subscription (subscribe) to what is known as the notification provider of the connecting module. The appliance manufacturer has the opportunity to implement the heartbeat function. In this case, it ensures that the sensor/effector which is encapsulated is also active and available and is behaving correctly. An inactive sensor, effector or an inactive encapsulation results in the heartbeat message being absent. A watchdog timer listens for heartbeat messages. In the absence of heartbeat messages, the watchdog timer triggers a restart for the responsible encapsulation software.

According to one advantageous development of the invention, it is proposed that the connecting module comprise a first module unit, which maps the connected sensor, effector or actuator as a service in the SOA network, and a second module unit, which conditions the service mapped by the first module unit for transmission via a radio network with low bandwidth while retaining the SOA functionality. The first module unit is also called a Vendor Device Encapsulator (VDE). The second module unit is also called a Lightweight Service Bus Node (LSBN).

The VDE is used for encapsulating an arbitrary appliance without SOA capability as a web service which can be recognized and managed (in connection with services, reference is also made to "orchestration" of services) by the existing service bus. The VDE generates a service which can be accessed by means of a request-response module of the VDE (e.g. in SOAP) and by means of a publish/subscribe module of the VDE (e.g. in JMS (Java Messaging Service) format). The VDE hosts the service encapsulation in a self-contained realm of the VDE, the "sandbox", which prevents any malfunctions in the service or in the encapsulated appliance from impairing the host system (the operating system of the connecting module or the VDE). The sandbox also ensures that the intellectual property of the appliance manufacturer is protected. This means that the user or a person with malicious intent has no opportunity to access the software and the source code which the manufacturer has installed in the TSBI. The VDE provides a large number of different interfaces to ports on appliances to be encapsulated for a service. The services produced by means of the VDE are stored in a service registry of the VDE. Depending on the properties and capabilities of the service bus, the service registry provides various maps or manners of presentation ("representation") of the service, e.g. in WSDL, with the representation of the service not necessarily needing to correspond to the WS-I (Web Services Interoperability Organization) recommendations. This makes it theoretically possible for a generated service to be able to be referenced by any desired service bus.

The LSBN (Lightweight Service Bus Node) allows or improves the use of the connecting module in the military world. An LSB (Lightweight Service Bus) is a totally distributed service bus. The term LSB does not denote an appliance, but rather denotes an abstraction of a plurality of LSBNs which are networked to one another. The LSB proposes a service bus which is customized to the requirements in the military world. By way of example, these requirements include special security mechanisms, low transmission rates via (radio) transmission links.

In contrast to the connecting module which is known from the IEEE publication "Service-Oriented Sensor Data Interoperability for IEEE 1451 Smart Transducers", the TSBI or the VDE does not require the systems that are to be encapsulated to be transducers or to comprise transducers. The invention can provide an SOA interface for any type of system. The TSBI or the VDE does not require a particular type of protocol or technology in order to be able to communicate with the system. The TSBI or the VDE is a framework which allows the generation of a definition which is suitable for all operations provided by the system (e.g. turnLeft, getPicture, etc.). A framework for the relevant program code is generated using a definition for the system that is to be incorporated. The manufacturer of the system that is to be encapsulated fills the framework with appropriate functions in the source code and interacts with the system in a manner which it desires. When the manufacturer has finished this step, it compiles the source code into a binary code and imports the latter into the TSBI or into the VDE. The TSBI and the VDE will use the binary code in order to communicate with the encapsulated system and in order to automatically generate a web service interface for an arbitrary type of SOA environment (bus, client, web-service interface compliant or otherwise). The TSBI or the VDE allows an SOA interface to be generated for a sensor without the need for specific detailed knowledge about the SOA environment.

In contrast to the connecting module which is known from the IEEE publication "Open Sensor Web Architecture: Core Services", the TSBI sets up a direct connection to the systems that are to be incorporated. The VDE or the TSBI requires no particular standard and no particular protocol in order to be able to interact with the system. The VDE is not an architecture but rather is a framework which allows the generation of an SOA interface for connecting arbitrary systems to the SOA environment, regardless of what interface the systems have. That the VDE can also encapsulate heterogeneous systems, the VDE is also called a generic encapsulation apparatus ("generic encapsulator"). Unlike in the case of the known NICTA method, the encapsulation of a system in the present invention does not require any knowledge about SOA or web services. The TSBI also provides extended functionalities which are not mentioned in the case of the known connecting module. By way of example, these are what is known as a "heartbeat" function, in order to ensure that the encapsulation software and the encapsulated appliance (sensor or effector) is still active and available, what is known as "traffic shaping", in order to protect the network against an usually large volume of data that is sent by the sensor, or what is known as "sandboxing", in order to prevent the TSBI from appearing to work normally and properly despite erroneous behavior by the system, for example on account of a defective sensor, a defective encapsulation in the VDE and/or a defective configuration of the VDE.

The TSBI requires no model language for presenting the data; it supports any type of XML presentation and encryption. The TSBI is particularly well prepared for use in a military environment. All components (sensors, actuators, effectors) are distributed (e.g. each node has a dedicated registry), so that a malfunction at a node does not result in a malfunction in the entire sensor network. The TSBI provides two interfaces in order to be able to interact with the encapsulated systems, namely a request-response interface and also a publish/subscribe interface. For notification, the TSBI preferably does not use user registrations for subscription, but rather uses what are known as topics (subjects, identifications). In a military context, all services are distributed.

Unlike the known NICTA connecting module, the TSBI does not mix the sequence management ("orchestration") of the services, the service bus and the SOA system encapsulation. The VDE provides a static SOA encapsulation for a system, and the military Lightweight Service Bus Node (LSBN) or another Enterprise Service Bus (ESB) provides the bus infrastructure and possibly also sequence management capabilities. A service consumer logic unit at the client end looks after the sequence management of the services. The TSBI also aims to be an interface between the system (sensor, actuator and/or effector) and a bus in arbitrary form. Since the SOA web service is not developed manually, but rather is generated automatically by the framework (the reference system), it is possible to propose any type of WSDL presentation which is theoretically possible, which can be presented in an arbitrary service bus, even if said presentation does not meet the specifications of the web service interoperability presentation.

The present invention thus relates to the encapsulation of non-service-oriented systems in order to be able to access the functionalities or system capabilities via web service compliant interfaces. The TSBI is distinguished particularly in that the connecting module contains a generic web service component which provides web service compliant interfaces to the outside. The connecting module can also provide interfaces which are not web service compliant, so that current Enterprise Service Buses (ESBs) which do not meet the standards 100% or have proprietary functional features (what are known as features) can likewise consume the service.

in that the TSBI contains an interface component which needs to be instantiated on the basis of the system to be connected (the sensor) and which is connected at the other end to the web service component (the SOA network), in that the TSBI contains an interface for generating an SOA interface to the outside and a framework for implementing an encapsulation of the sensor. This encapsulation can then be implemented outside the TSBI by using a suitable development environment, that is to say can be "brought to life" on the basis of the type of sensor that is to be encapsulated. The development environment allows the respective manufacturer of the system that is to be connected (sensor manufacturer) to instantiate the invention on the basis of the connected system, in that the invention is accommodated in a separate housing which is robust enough even for harsh operational environments.

As an alternative to arranging the TSBI in a separate housing, it is also possible for the TSBI to be configured as a pure software solution. In this case, a piece of software which can be executed on an arbitrary computer (e.g. a personal computer, PC) would be programmed such that it can implement an encapsulation of a system without SOA capability that is connected to the computer and the integration of the system into an SOA environment when it is executed on the computer or on a microprocessor in the computer.

The TSBI infrastructure optimizes the sequences concerning tactical operations for a simultaneously distinctly limited radio or network quality. This is achieved by virtue of particularly advanced data compression methods, customizations for the data transmission protocol and a distinct reduction in terms of the data throughput.

The TSBI infrastructure meets extremely high mobility demands and ensures availability, even if some sensors are faulty. Therefore, there is virtually no possibility of the entire SOA system collapsing as a result of a single faulty sensor, a fault in an encapsulation or in the configuration of the connecting module (what is known as a single point of failure), for example.

The TSBI is a high-performance platform which is a fast, simple and inexpensive implementation of an SOA infrastructure within already existing or used systems. The known systems without SOA capability can therefore be integrated into future SOA systems quickly and easily.

The use of the connecting module according to the invention provides the user with a distinct cost advantage, since the costs for the connecting module and for programming the programmable portion of the computer program which the connection between the firmware of the sensor, on the one hand, and the firmly prescribed portion of the computer program are distinctly lower than the costs which a completely new sensor with SOA capability would generate. The TSBI is a standard connecting module (what is known as an off the shelf SOA platform) which extends conventional sensors which inherently have no SOA capability by an SOA capability.

In the computer program which can be freely programmed by the sensor manufacturer for the connecting module, the sensor manufacturer has the opportunity to easily and inexpensively integrate algorithms and flows so that the firmware of the sensor is customized to the SOA environment. The SOA environment or the way in which SOA processes are handled may be prescribed by a superordinate organization, for example by NATO (North Atlantic Treaty Organization), the IT office of the German Federal Armed Forces, the Federal Ministry of Justice or the Federal Ministry of the Interior. In this case, the sensor or the functionality thereof is mapped as a service in the SOA environment.

It is conceivable for a connecting module according to the invention (TSBI) to be associated not only with one sensor but rather with a multiplicity of sensors. It is likewise conceivable for a sensor to have not only one detector but rather a plurality of detectors. By way of example, this allows a sensor to use a camera to capture a physical area that is to be monitored, to use a geophone to detect tremors and to use a thermometer to capture a temperature. In such multisensor systems, the individual detectors are connected to the first interface of the TSBI via a sensor node. Different sensors can also be connected directly to the connecting module.

By means of the SOA environment, the information and data from different detectors and sensors can be interconnected and output to the user on a standard interface. Furthermore, it is possible for the user to use the SOA network to obtain access to the sensors coupled to the SOA network via the TSBI, in order to actuate said sensors or the detectors thereof. By way of example, it is thus conceivable for the user to be able to use the SOA network to control the direction of view of a camera. It is possible for the information and data collected in an SOA environment to be presented to a plurality of users on different interfaces. However, the actuation of the sensors via the SOA network can only ever be effected by one of the users.

Preferred exemplary embodiments of the present invention can be taken from the subclaims. Further features and advantages of the invention are described in the description of the figures below, with the cited features and advantages being able to be present not only in the combination described but also on their own. In the figures:

FIG. 10 shows the principle of the inventive encapsulation of an appliance.

Figure 1:
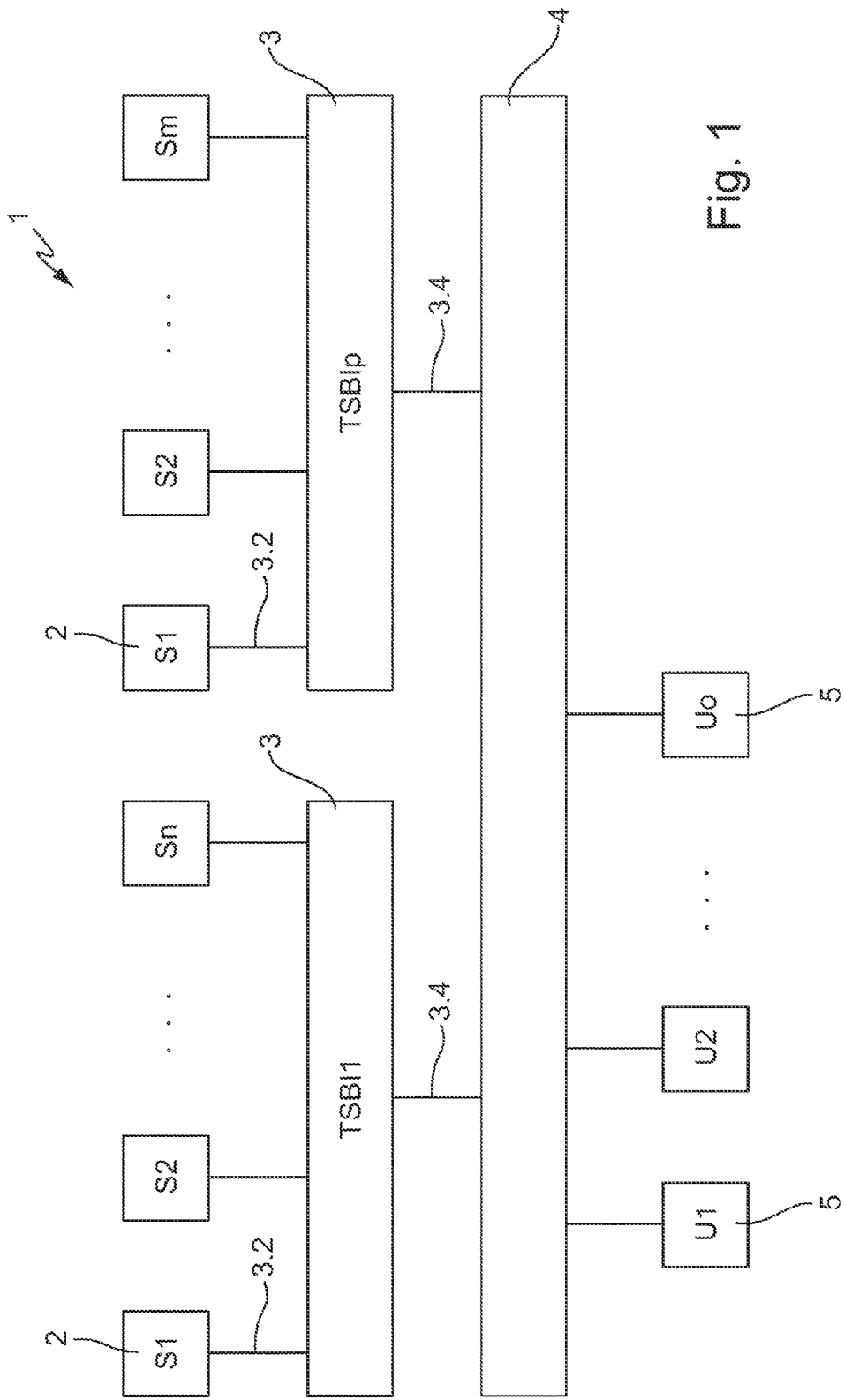
FIG. 1 shows an SOA network structure.

FIG. 1 shows an SOA network structure as may be used in the realm of security and/or defense engineering, for example. The SOA network structure is denoted as a whole by the reference symbol 1. The structure 1 first of all comprises a plurality of sensors 2 which are denoted by S1, S2, . . . Sn and S1, S2, . . . , Sm, where n and m are natural numbers >1. The explanations which follow refer only to sensors, for the sake of simplicity. However, the explanations also apply accordingly to effectors (e.g. arbitrary weapons systems) and actuators (e.g. arbitrary drive systems).

In the exemplary embodiment described, the sensors 2 are in the form of cameras for capturing a physical area, geophones for detecting tremors, in the form of temperature sensors for capturing temperatures, in the form of pressure sensors for capturing a pressure or in the form of any other sensors which provide information about a physical area that is to be monitored, an emergency vehicle that is to be monitored or the like, for example. The sensors 2 are inherently without SOA capability.

The sensors 2 are connected to connecting modules 3 according to the invention which convey an SOA capability to the sensors 2. The connecting modules 3 are also called a Tactical Service Bus Interface (TSBI). In the exemplary embodiment, a respective plurality of sensors 2 are connected to a connecting module 3. However, it is also conceivable for just one sensor 2 to be connected to a connecting module 3. In the exemplary embodiment, the connecting modules are denoted by TSBI1 and TSBIp, where p is a natural number >1. The TSBIs 3 are preferably arranged in proximity to the sensors 2. If the sensors are arranged on an emergency vehicle, for example, a TSBI 3 would preferably likewise be arranged on the vehicle. The sensors 2 are connected to the TSBIs 3 preferably via first interfaces 3.2. The first interfaces 3.2 are preferably in the form of RS232 and/or LAN interfaces.

The connecting modules 3 are for their part connected to a communication infrastructure 4. This may be in the form of an arbitrary bus structure which is used to transmit data messages on the basis of a particular bus protocol, or the like. The bus structure 4 is a CAN or TTCAN bus, for example. The communication infrastructure 4 may be implemented in linebased or cordless form, particularly by means of radio. The infrastructure 4 may be in the form of an arbitrary data transmission link, for example in the form of a radio link, from the TSBIs 3 to an exchange, via which there is access to the Internet/to an intranet. In this exemplary embodiment, the infrastructure 4 would thus be formed by the data transmission links and the Internet/intranet. The communication infrastructure 4 is connected to the TSBIs 3 preferably via second interfaces 3.4. These are preferably in the form of radio interfaces. The access to the Internet/intranet allows sensor/effector encapsulations located in a repository on a server to be accessed. These encapsulations can be downloaded and installed on the TSBI.

Finally, the SOA network structure 1 has users 5 which are connected to the communication infrastructure 4. The users are denoted by U1, U2, . . . , Uo, where o is a natural number >1. By way of example, the users 5 are connected to the Internet 4 via computers with internet capability. The computers preferably provide the users 5 with an output device (e.g. a screen, a printer, etc.) for the output of information and an input device (e.g. a keyboard, a mouse, a trackball, etc.) for the input of information and commands, respectively.

Figure 2:
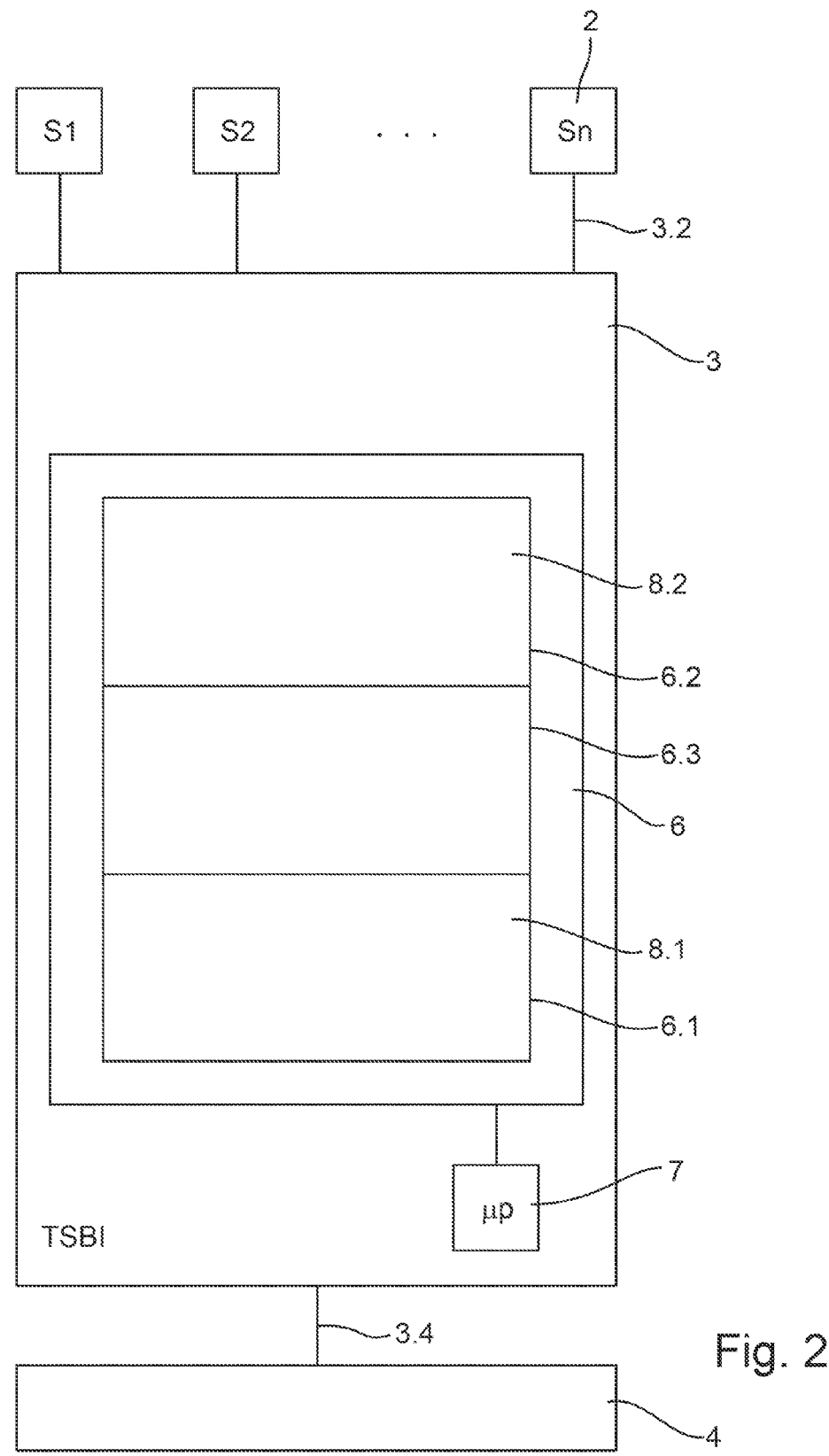
FIG. 2 shows a connecting module according to the invention based on a first preferred embodiment.

FIG. 2 shows a TSBI 3 according to the invention, such as the TSBI1 or the TSBIp, in detail. It first of all comprises at least one program and/or data memory 6, which may be in the form of a ROM, an EEPROM or a flash memory, for example. The memory 6 stores a computer program which is executed in a computation appliance 7 of the TSBI 3. The computation appliance 7 is preferably in the form of a microprocessor. Alternatively, it is conceivable for the computation appliance 7 to be in the form of a digital signal processor (DSP) or the like. The computation appliance 7 can also coordinate and control the functional sequences on the interfaces 3.2 and/or 3.4.

The computer program stored in the memory 6 is divided into at least two sections 8.1 and 8.2 which are stored in various memory areas 6.1 and 6.2 of the memory 6. In the exemplary embodiment described, a third memory area 6.3 does not store a computer program; this memory area 6.3 is thus free in this exemplary embodiment. It goes without saying that it may also store a section 8.1 and/or 8.2 of the computer program. Furthermore, it is also possible for the free memory area 6.3 to be dispensed with.

A first section 8.1 of the computer program comprises those portions of the computer program which relate to standard sequences. By way of example, these may be sequences which relate to the actuation and manner of operation of the interfaces 3.2 and 3.4. Furthermore, the first section 8.1 of the computer program may relate to the specifications stipulated by NATO, for example, for how the individual SOA processes and services are handled in the SOA network structure 1. The first section 8.1 of the computer program is prescribed by the manufacturer of the TSBI 3 and is programmed during or subsequent to the manufacture of the TSBI 3 at the end of the line. Only then is the TSBI 3 delivered to the customers, i.e. to the manufacturers of the sensors 2.

The sensor manufacturers then develop and program another section 8.2 of the computer program and store it in the memory 6, in the memory area 6.2 provided for this purpose. The software programmed by the sensor manufacturer sets up a connection between the normally proprietary sensor firmware and the prescribed and largely standardized SOA environment. During the programming, the sensor manufacturer can build on that section 8.1 of the computer program which has already been developed by the manufacturer of the TSBI 3. In the programming and implementation phase, the sensor manufacturer can be assisted by the manufacturer of the TSBI 3. In this way, the sensors 2 which are inherently without SOA capability can be integrated into the SOA environment easily and quickly. Both sections 8.1 and 8.2 together form the computer program which is executed on the computation appliance 7 of the TSBI 3 in order to integrate the connected sensors 2 into the SOA network structure 1.

In one example of application, when the Federal Armed Forces are deployed abroad, it is a requirement for a particular grid square in the country to be monitored from 10:00 to 16:00 hours. The reconnaissance operation can be coordinated and evaluated by the users 5 locally, i.e. from Germany, for example. To this end, one of the users 5 actuates the sensors 2 in suitable fashion. This can be accomplished using a graphical user interface (GUI), for example, which can be presented on the screens of the computers associated with the users 5 and can be controlled using a keyboard, mouse or the like.

At the start of the reconnaissance operation, the user 5 ascertains which sensors 2 are actually available in the prescribed grid square. If appropriate, a vehicle, a drone or the like having at least one TSBI 3 and additional sensors 2 can be ordered into the grid square during the prescribed period. The SOA network structure 1 would then be used to provide the user 5 with information to the effect that additional sensors 2 are available for the reconnaissance operation. The user 5 can actuate the sensors 2 in the required manner using its associated computer. This firstly comprises the activation and deactivation of the sensors 2. Secondly, however, it also comprises specific control of the sensors 2 during operation thereof, for example in order to be able to alter the capture range of a camera. It would also be conceivable to control the vehicle, the drone or the like. Using the example of a sensor 2 in the form of a radar appliance, the actuation of the sensor 2 comprises the selection of a sector (of a monitored region), control of a scan function (scanning of the monitored region), of a track function (tracking of an object in the monitored region) or of a tilt/swivel head on which the radar sensor is mounted.

The actuation commands from the user 5 for a sensor 2 are first of all taken from the SOA environment by the firmly prescribed portion 8.1 of the computer program and converted into appropriate raw data, which that portion 8.2 of the computer program which has been programmed by the sensor manufacturer then converts into appropriate actuation signals for the sensor 2. In the converse direction, the measured values or measurement signals from the sensor 2 are converted by the freely programmed software portion 8.2 into raw data, which the firmly prescribed software portion 8.1 then introduces into the SOA environment.

Each of the sensors 2 can be actuated only by one user 5 via the SOA network structure 1. However, the captured sensor measured values provided by means of the SOA network structure 1 can be captured by a plurality of users 5. The users 5 can then immediately start to evaluate the sensor measured values and thus to draw up plans for the further action in this grid square, for example attack or defense plans.

The sensors 2 and/or the functionality thereof is/are presented as services in the SOA environment. This substantially clarifies and simplifies the capture and evaluation of the sensor measured values and also the coordination and control of operations in the realm of security and/or defense engineering. The basic concept underlying the present invention sets out from sensors 2 which are inherently without SOA capability and which are intended to be incorporated into the SOA environment as easily, quickly and inexpensively as possible. To this end, the sensor manufacturers are provided with a programming and development environment which is as open as possible.

Figure 3:
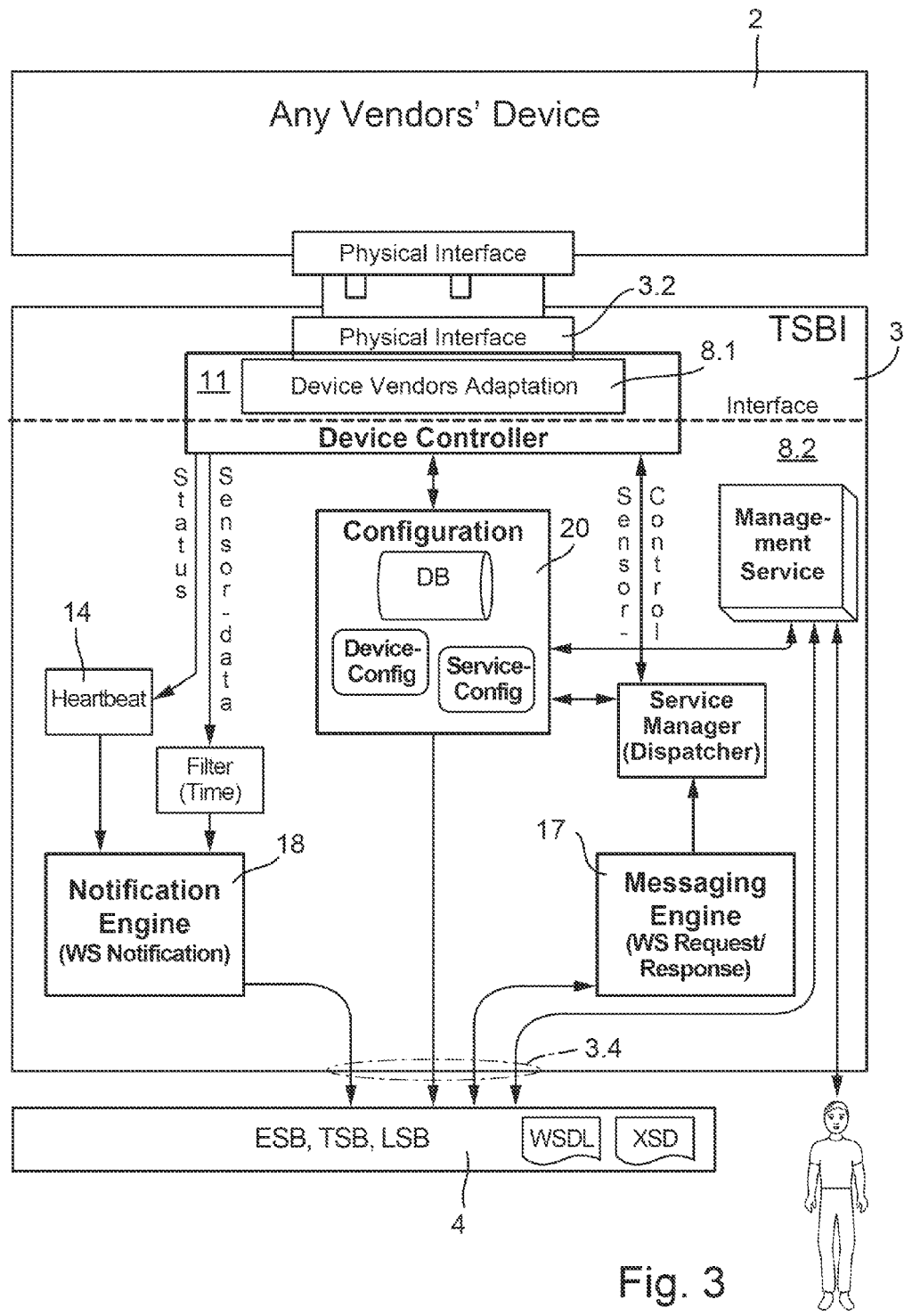
FIG. 3 shows a basic illustration of the combination of a conventional sensor with the connecting module according to the invention.

FIG. 3 shows a basic illustration of the present invention which defines the components which each undertake part of the functionality in order to comply with all demands which are made on the TSBI. In this case, the central components are the notification engine and the messaging engine, which undertake the tasks concerning web service compliant access and communicate with the respective infrastructure. In this case, the notification engine undertakes the task of sending unprompted reports to users with an interest; it therefore represents the publish/subscribe MEP (Message Exchange Pattern). The messaging engine is responsible for the request-response MEP, which is used to respond to requests to the device in a corresponding format (response).

If all services in an SOA environment (e.g. in the enterprise service bus) are registered in a central registry with associated meta data, the TSBI needs to undertake the registration for the non-service-oriented system which is connected to it. The configuration block undertakes this task. Alternatively, it is conceivable for the TSBI not to undertake the registration for the connected SOA infrastructure, but rather merely to provide a passive interface, so that the SOA infrastructure can access meta data and service descriptions (WSDL). In this case, the TSBI contains a registry which stores all services which are known to it. The TSBI provides an interface in order to be able to retrieve these services. In this case, the TSBI does not undertake the registration for the non-service-oriented system which is connected to it. However, the system can retrieve the service lists from the TSBI and enter at least details from the content thereof into its own registry.

The device controller (also called encapsulation software), which does not have to be implemented for the respective non-service-oriented system which is to be connected, forms the interface between the web service component and the legacy component.

Furthermore, a development environment (IDE) is provided, which is not shown in the figure. This is used to instantiate the device controller. This IDE may be part of the TSBI. Preferably, the TSBI does not contain a development environment, however, but rather provides an interface for generating an SOA interface to the outside and a framework for implementing an encapsulation of the sensor. This encapsulation can then be implemented outside the TSBI by using a suitable development environment, that is to say can be "brought to life" on the basis of the type of sensor that is to be encapsulated. The IDE is in a form such that any manufacturer of a system that is to be incorporated is able to produce the device controller from a prescribed framework. In FIG. 3, ESB denotes an Enterprise Service Bus, an LSB denotes a Lightweight Service Bus. WS denotes the Web Services, WSDL denotes a Web Service Definition Language and XSD denotes an XML scheme file.

Figure 4:
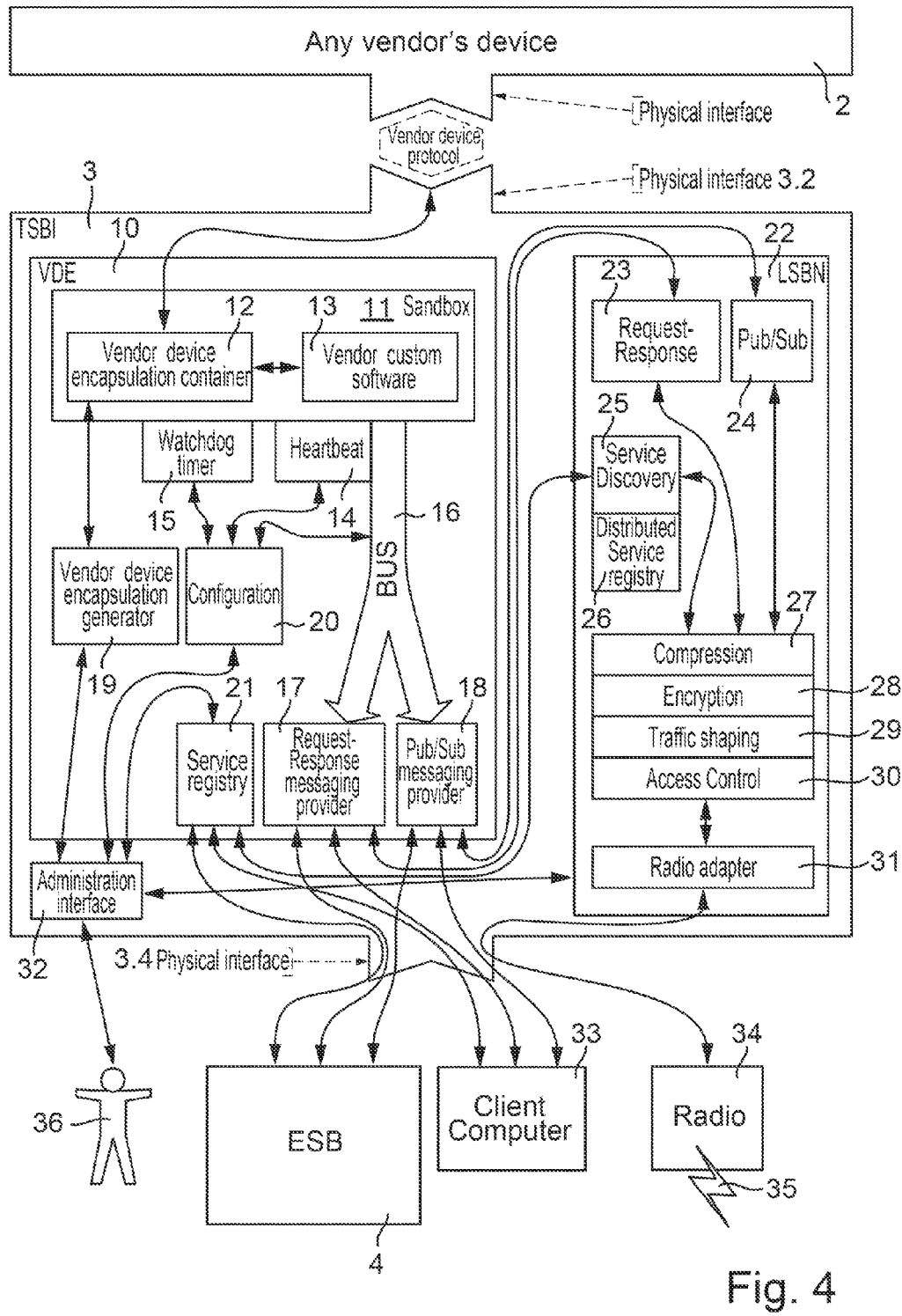
FIG. 4 shows a connecting module according to the invention based on a further preferred embodiment.

FIG. 4 shows a further preferred exemplary embodiment of the present invention. In this case, the split of the connecting module 3 into two module units should be highlighted, namely what is known as a Vendor Device Encapsulator (VDE) and what is known as a Lightweight Service Bus Node (LSBN). The VDE maps the connected sensor 2 as a service in the SOA network 4. The LSBN provides the service mapped by the first module unit (VDE) for transmission via a radio network with a low bandwidth ("radio") while retaining the SOA functionality. The TSBI may have either only the VDE or else a combination of VDE and LSBN.

The TSBI is a physical device which hosts the two module units. The VDE 10 is preferably implemented as a software system which allows an SOA interface to be generated for a sensor 2. The sandbox 11 denotes a physically and functionally limited environment which contains all the sensor 2 SOA encapsulations ("vendor device SOA encapsulation") and software which the sensor 2 requires in order to interact with the TSBI. Sensor SOA encapsulation denotes the functionality which is used to map the functionality of the sensor 2 in the SOA environment. The sandbox 11 is also used to protect the host system (TSBI) from possible attacks or (software) errors and ensures that the intellectual property of the appliance manufacturer in the form of the programmed encapsulations is protected. This means that the user or a person with malicious intent has no opportunity to access the software and the source code which the manufacturer has installed in the TSBI. The "Vendor Device Encapsulation Container" 12 is used as a container for the sensor encapsulations which have been produced using the VDE. The "Vendor Custom Software" 13 is a collection of software and data which are required by the sensor encapsulations in order to be able to interact with the sensor(s) 2.

Heartbeat 14 denotes heartbeat messages, which are sent when prompted by the sensor encapsulations in order to ensure that the sensor encapsulations are behaving correctly. A sensor encapsulation is behaving correctly when the sensor 2, the bus 4 and the SOA web service are behaving correctly.

Watchdog timer 15 denotes a module which ensures that all sensor encapsulations which the sandbox 11 contains are kept ticking over. The watchdog timer 15 receives heartbeat messages 14 sent by the encapsulations of the sensor 2 and evaluates them. If a sensor encapsulation does not send a heartbeat message during a defined period, a malfunction is assumed and the watchdog timer 15 starts the sensor encapsulation afresh in order to prevent the connecting module 3 or the service encapsulation from being blocked for the longer term. The watchdog timer 15 thus ensures that the service encapsulation is always running and that an error does not affect the entire connecting module 3 and possibly stop it functioning. The concept of the heartbeat service makes it possible to ensure that the processing takes place in a direction from bottom to top (sensor/actuator/effector 2—service—message bus 16—web service interface 17, pub/sub interface 18) without errors. To obtain heartbeat messages, the ESB 4 and/or the LSBN 22 need to subscribe to the heartbeat service via the pub/sub module 18. The subscribed service buses (ESB 4 and/or LSBN 22) then receive the heartbeat messages from time to time via the module 18.

BUS 16 denotes an internal bus system (what is known as a message bus) which connects the sensor encapsulations to the SOA web services interfaces (request-response interfaces 17 and publish/subscribe interfaces 18). The sensor 2 encapsulation generator 19 ("Vendor Device Encapsulation Generator") allows the generation of SOA web services and source text (source code) projects, which—once they have been compiled—result in sensor encapsulations ("Vendor Device SOA encapsulations"). A configuration module 20 ("Configuration Module") allows the host system and the other modules of the VDE 10 to be configured. Service registry denotes a module 21 which lists all sensor encapsulations which are present on the TSBI 3. The service registry 21 delivers heterogeneous WSDL files in order to allow platforms to use the sensor encapsulations, even when the platforms are not compliant with the WS-I (Web Services Interoperability Organization) recommendations. The WSDL files are individually tuned to the properties and functionality of the service bus (e.g. ESB 4 or LSBN 22). Request-response messaging provider 17 denotes an interface which allows the use of the sensor encapsulation web services by means of a request-response message exchange pattern. Pub/sub messaging provider denotes an interface which allows the use of the sensor encapsulation web services by means of a publish/subscribe message exchange pattern.

The modules 17, 18 and 21 thus contain practically all the knowledge about the SOA environment, particularly about the SOAP, and about the web services which is required for the encapsulation, which means that this knowledge no longer needs to be held, as previously, by the appliance manufacturer which is implementing the encapsulation of the appliance 2. Said appliance manufacturer can thus encapsulate the appliance 2 without knowledge or understanding about the SOA environment, the SOAP and web services. The manufacturer merely needs to know the interface of the appliance that is to be encapsulated and the programming language of the development environment. This results in the possibility of particularly simple and appliance manufacturer friendly encapsulation of appliances 2 and also a flexible encapsulation method which can be used for various appliances 2.

Lightweight Service Bus (LSB) denotes a distributed service bus which provides an SOA for tactical networks having limited bandwidth (e.g. radio networks) and particular security requirements. The LSB comprises one or more LSB units (LSB nodes; LSBNs) 22. A request-response module 23 is an interface to the request-response messaging provider 17 of the VDE 10. It transmits incoming request messages to the VDE 10 and receives response messages which leave the VDE 10. A publish/subscribe module 24 is an interface to the publish/subscribe messaging provider 18 of the VDE 10. It transmits incoming applications to the VDE 10 and intercepts notification messages which leave the VDE 10.

A service discovery module 25 indexes all the sensor encapsulation web services which are present on the VDE 10, and stores the associated service descriptions (e.g. WSDL). The service discovery module 25 allows the service descriptions which are on the LSBN 22' from other TSBIs 3' (cf. FIG. 8) to be retrieved. Since the TSBI 3 is intended for use in the tactical or military world (e.g. limited bandwidth of the radio networks), this synchronization with other LSBNs 22 does not take place automatically. The synchronization of the TSBI 3 (retrieval of the service descriptions from other nodes LBSN) takes place prior to use of the TSBI (e.g. as part of mission preparation) or during use as an exception and at the explicit request of a person authorized to do so. The ascertained service descriptions are stored in a data memory ("Service Registry") 26. This service register 26 is of fully distributed design ("Distributed Service Registry"), because, in contrast to Enterprise Service Buses (ESB) 4, there is no central service register in this case.

The knowledge of the LSBN 22 about services comprises the totality of all service descriptions which are stored in the service register 26 of each TSBI 3, 3' in the network.

Different modules, such as "Compression" 27, "Encryption" 28, "Traffic Shaping" 29 and "Access Control" 30, are described in more detail below. These modules are each already known from the prior art separately and from other realms outside the SOA environment. To implement the TSBI according to the invention, however, the inherently known modules are used and interconnected in a particular manner in order to provide added value in the SOA environment in comparison with known SOA encapsulations.

A compression module 27 compresses all messages which leave the LSBN 22 in the direction of the radio network, and decompresses all messages which enter the LSBN 22 from outside the TSBI 3. An encryption module 28 encrypts all messages which leave the LSBN 22 in the direction of the radio network, and decrypts all messages which enter the LSBN 22 from outside the TSBI 3. A traffic shaping module 29 monitors the available bandwidth of the limited network and ensures that malfunctions in the sensor encapsulation web services or defective configurations do not result in an abnormal number of messages which inundate the network. An access control module 30 ensures that the SOA corresponds to a lightweight but secure security model which has been developed for military networks having low bandwidth.

A radio adapter 31 is a module which converts the messages which leave the LSBN unit 22 into data packets which are optimized for particular radios. The radio adapter 31 takes account of special features of the different radios, for example network protocols, size of the data packets, bandwidth, physical interfaces, and forwards the data packets to the radio. Furthermore, the radio adapter 31 intercepts data which arrive from the radio and converts them into messages which can be understood and processed by the LSBN 22.

Finally, the TSBI 3 has a user interface 32 which is called an administration interface. The interface 32 can be used to configure the VDE 10 and the LSBN 32. This is preferably accomplished using an interactively operatable graphical user interface. The Enterprise Service Bus (ESB) 4 processes web services which are available on the VDE 10 via the VDE SOA interface 3.4. The ESB 4 registers web services from the VDE 10 by installing WSDL files which are requested from the service registry module 21 of the VDE 10. A client computer 33 processes web services which are available on the VDE 10 via the VDE SOA interface 3.4. In this case, web service proxies can be generated directly from the WSDL files which are requested from the service registry module 21 of the VDE 10. "Radio" denotes a radio 34 comprising a transmitter and/or receiver. The subordinate radio network is denoted by 35.

Figure 5:
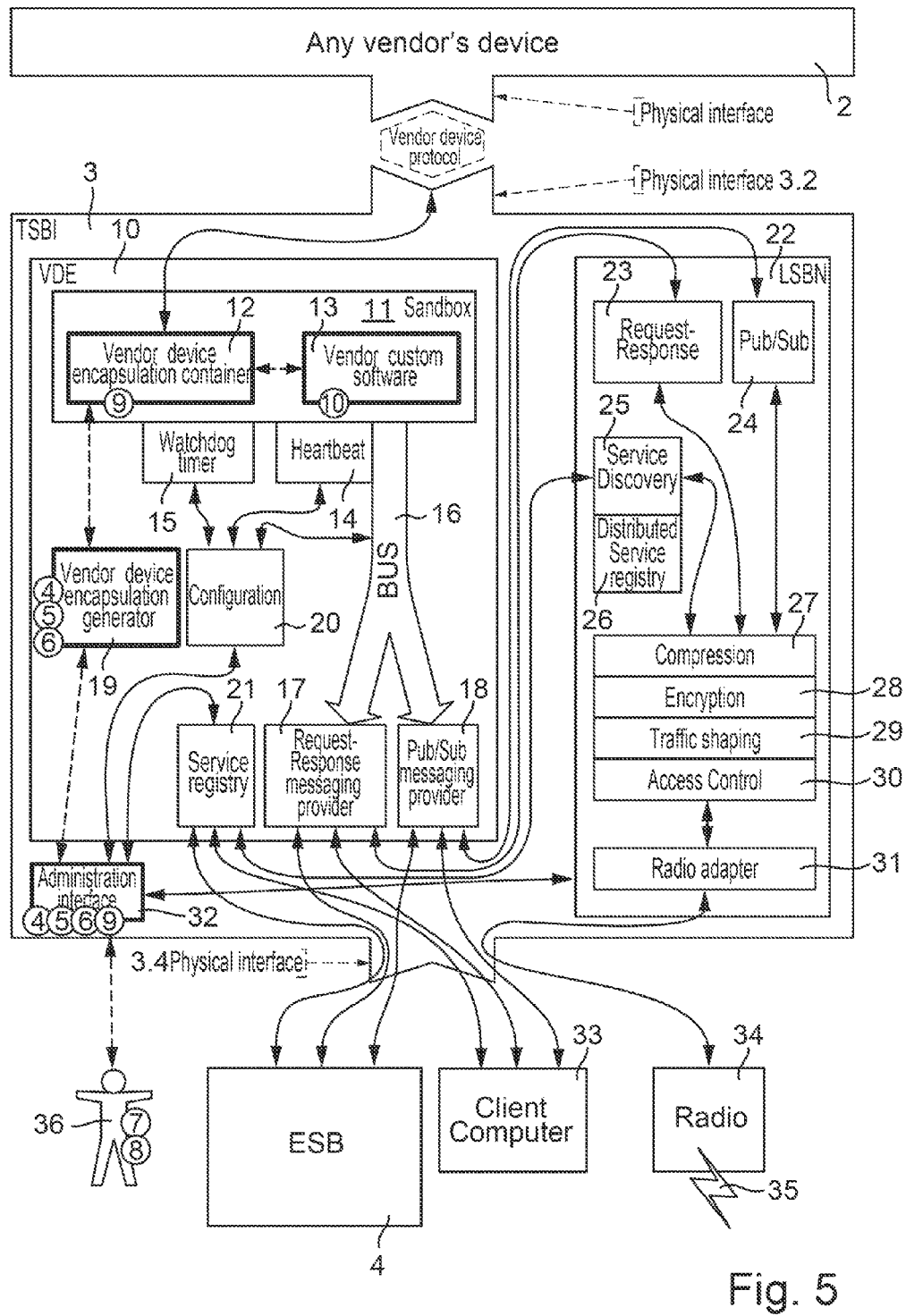
FIG. 5 shows the principle of generation of an SOA encapsulation for a sensor using the connecting module from FIG. 4.

The text below provides a more detailed explanation of the individual steps for generating a sensor SOA encapsulation ("Vendor Device SOA Encapsulation") with reference to FIG. 5. The connecting module 3 from FIG. 5 corresponds to that shown in FIG. 4. FIG. 5 additionally indicate a few more method steps by means of numbers in circles. The method steps are executed in rising order and essentially at the location at which they are shown.

In a first step 1 (not shown in FIG. 5), a data transmission link is set up between a development computer and the TSBI 3, preferably by virtue of the TSBI 3 being connected to the computer by means of a cable. In addition, a data transmission link is set up between the development computer and the sensor 2 that is to be encapsulated, preferably by virtue of the sensor 2 being connected to the computer by means of a cable. The sensor 2 may also be in the form of an arbitrary effector, actuator or other unit, the functionality of which is intended to be mapped in the SOA environment. The development computer may be in the form of a conventional personal computer (PC), in the form of a laptop, a palmtop computer and possibly even in the form of a smartphone. The development computer is represented in FIG. 5 by its user 36. Preferably, the computer is connected to the TSBI 3 via Ethernet. Next, in a step 2 (likewise not shown), the TSBI 3, the development computer and the sensor 2 are switched on, that is to say are supplied with power and started up (booted), if necessary. In a step 3 (likewise not shown), a connection is then set up from the development computer to the management location of the administration interface 32.

In a step 4, a name space for a particular service is then generated in the vendor device encapsulation generator 19 via the administration interface 32. To this end, the name of the manufacturer or vendor of the sensor 2, a name for the service and a version number need to be input. In a step 5, the service operations are then likewise defined in the vendor device encapsulation generator 19 likewise via the administration interface 32. To this end, functions and notifications are input. Next, in a step 6, the framework of the program code for the project is downloaded in the vendor device encapsulation generator 19 likewise via the administration interface 32. In a step 7, the user 36 then opens the downloaded project using a software development tool, and the service logic and the communication with the sensor 2 are implemented. Finally, in a step 8, the user 36 produces and tests a binary file for the project using a builder.

In a step 9, the project is then uploaded into the TSBI 3 via the administration interface 32. The binary file is stored in the device encapsulation container 12. In a step 10, what is known as remote logging (remote desktop) is then used to install the requisite software in the sandbox 11. To this end, the sensor manufacturer logs onto the virtual computer (the sandbox 11) from a remote computer (the development computer 36). This allows the manufacturer to load extra software into the sandbox 11 and install it thereon. Finally, in a step 11, the sensor 2 is detached from the development computer and connected to the TSBI 3. This completes the production of sensor encapsulation, and the functions of the sensor 2 are mapped in the SOA environment.

Figure 6:
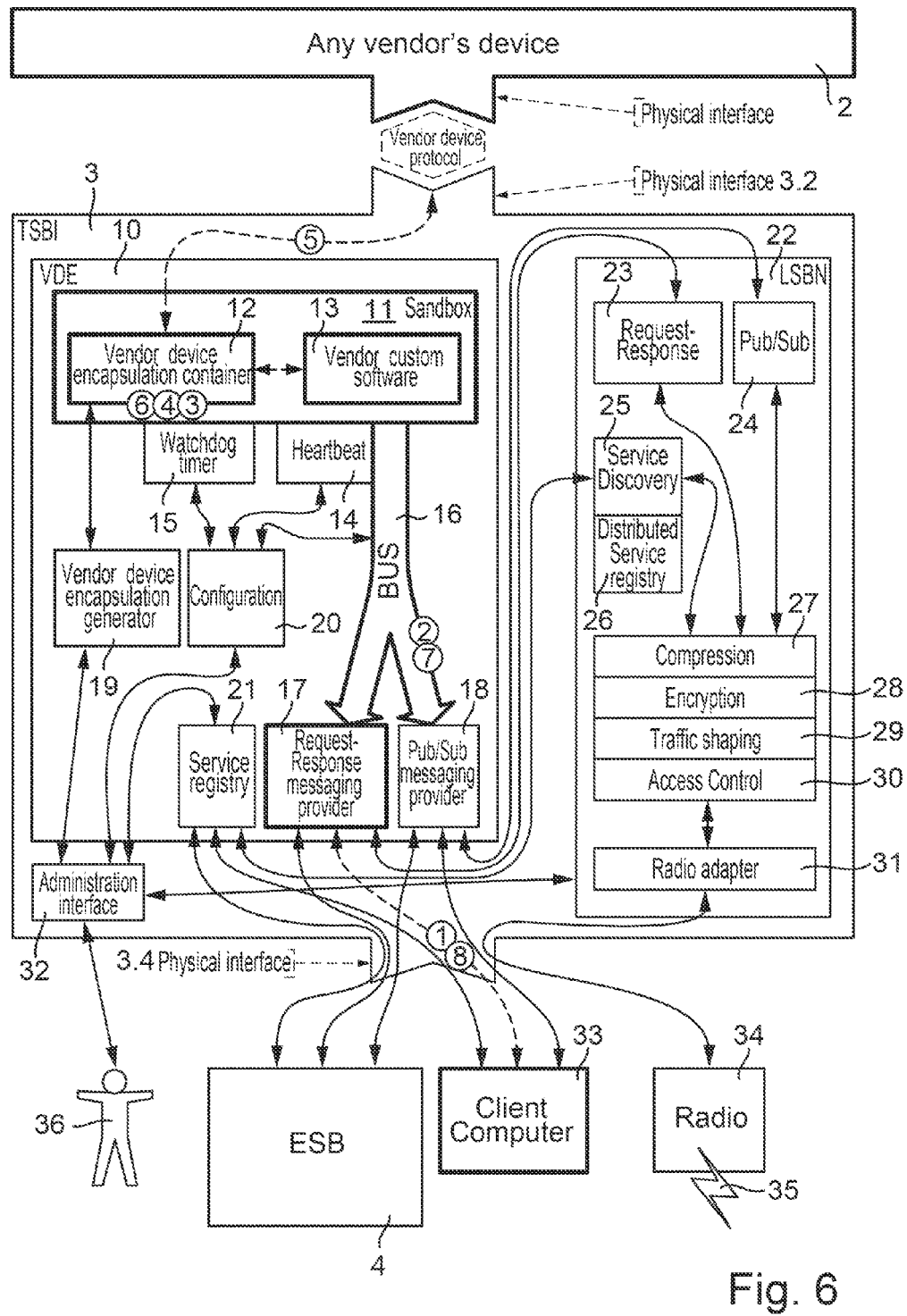
FIG. 6 shows the principle of communication between a client computer from the SOA environment and an encapsulated sensor using the connecting module from FIG. 4.

The text below provides a more detailed explanation of the individual steps of communication between the client computer 33 from the SOA environment and the sensor 2 via the sensor SOA encapsulation ("Request Response") with reference to FIG. 6. The connecting module 3 from FIG. 6 corresponds to that shown in FIG. 4. FIG. 6 additionally indicates a few more method steps by means of numbers in circles. The method steps are executed in rising order and essentially at the location at which they are shown. The method steps from FIG. 6 are independent of the steps in FIG. 5 and have nothing to do with them, even though the individual steps have the same numbers in some cases.

In a first step 1 in FIG. 6, a request message in SOAP (Simple Object Access Protocol) format comes to the request-response messaging provider 17 of the TSBI 3 from the client computer 33 via the physical interface 3.4. The message is transmitted via the bus 16 in a step 2 and finally enters the vendor device SOA encapsulation container 12 in a step 3. A function is then called in a step 4, which function ascertains the sensor function corresponding to the service addressed by the SOAP message by means of reflection (allows it to retrieve information about classes or the instances thereof in the case of object-oriented programming). In a step 5, the sensor SOA encapsulation 12 interacts with the sensor 2. The output or the response of the sensor 2 is converted into a SOAP message in a step 6. The response message in SOAP format is transmitted to the request-response messaging provider 17 via the bus 16 in a step 7. Finally, in a step 8, the SOAP response message leaves the request-response messaging provider 17 and is returned to the client 33.

When a client computer 33 wishes to log onto the TSBI 3, it sends a logon message to the publish/subscribe messaging provider 18 and is recorded there as a subscriber. Every notification comprises a topic (subject; reference) and a body (content). The topic is an identification parameter; the body is a content description of the message which is sent out during notification. For the publish/subscribe message exchange pattern, the user (consumer; client 33) needs to notify the provider (TSBI 3) of which notifications it is interested in (communication of the topics). When a notification is triggered with the provider, it sends it to all users which have subscribed for this topic.

Figure 7:
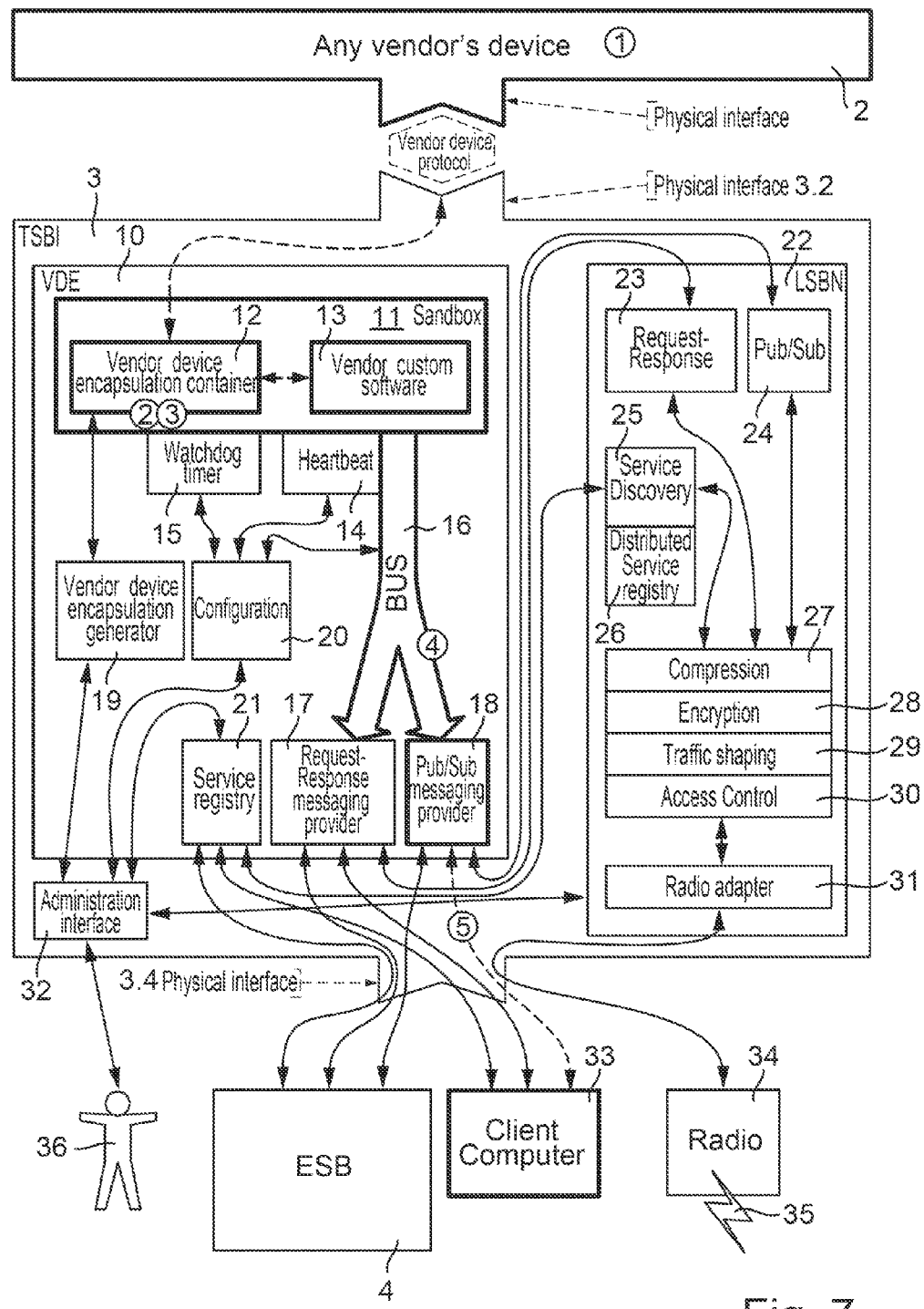
FIG. 7 shows the principle of message transmission between the one client computer from the SOA environment and an encapsulated sensor using the connecting module from FIG. 4.

The text below provides a more detailed explanation of the individual steps which are executed when participants in the SOA environment are informed about events in the sensor 2 ("Publish") with reference to FIG. 7. The connecting module 3 from FIG. 7 corresponds to that shown in FIG. 4. FIG. 7 additionally indicates a few more method steps by means of numbers in circles. The method steps are executed in rising order and essentially at the location at which they are shown. The method steps from FIG. 7 are independent of the steps in FIGS. 5 and 6 and have nothing to do with them, even though the individual steps have the same numbers in some cases.

In a first step 1 in FIG. 7, a particular event occurs in the sensor 2 (e.g. a radar detects an object and delivers what is known as a track; a motion sensor reports small changes in acceleration or the like). The sensor encapsulation 12 is informed about this in a step 2 and calls the associated notification function. The output of or by the notification function is converted into an SOA message in a step 3. The message is transmitted to the pub/sub messaging provider 18 via the bus 16 in a step 4. The pub/sub messaging provider 18 then transmits the SOA message to all client computers 33 registered with the TSBI 3 as subscribers in the SOA environment in a step 5.

Without referring to any particular figure, the text below explains the different method steps which are required in order to develop a web service client using a computer (represented by the user 36 in FIGS. 4-8). In a first step 1, a data link is set up between the computer 36 and the TSBI 3, for example by virtue of the computer 36 being connected to the TSBI 3 by means of a cable. In a subsequent step 2, a suitable WSDL (Web Services Description Language) is requested from the service registry 21 of the TSBI 3 and is downloaded onto the computer 36. In a step 3, the source code for the service proxy is then generated from the WSDL. Finally, in a step 4, the proxy is imported into the software development tool which is being executed on the computer 36, and the web service client is developed.

Without referring to any particular figure, the text below explains the different method steps which are required in order to achieve integration in an enterprise service bus (ESB) 4. In a first step 1, a data link is set up between the TSBI 3 and a subscriber on the service bus (service bus node), for example by virtue of the TSBI 3 being connected to the system which hosts the ESB stub 4 by means of a cable or when the ESB stub 4 is installed on the TSBI 3. In a subsequent step 2, a suitable WSDL (Web Services Description Language) is requested from the service registry 21 of the TSBI 3 and is installed in the service registry of the ESB 16.

Figure 8:
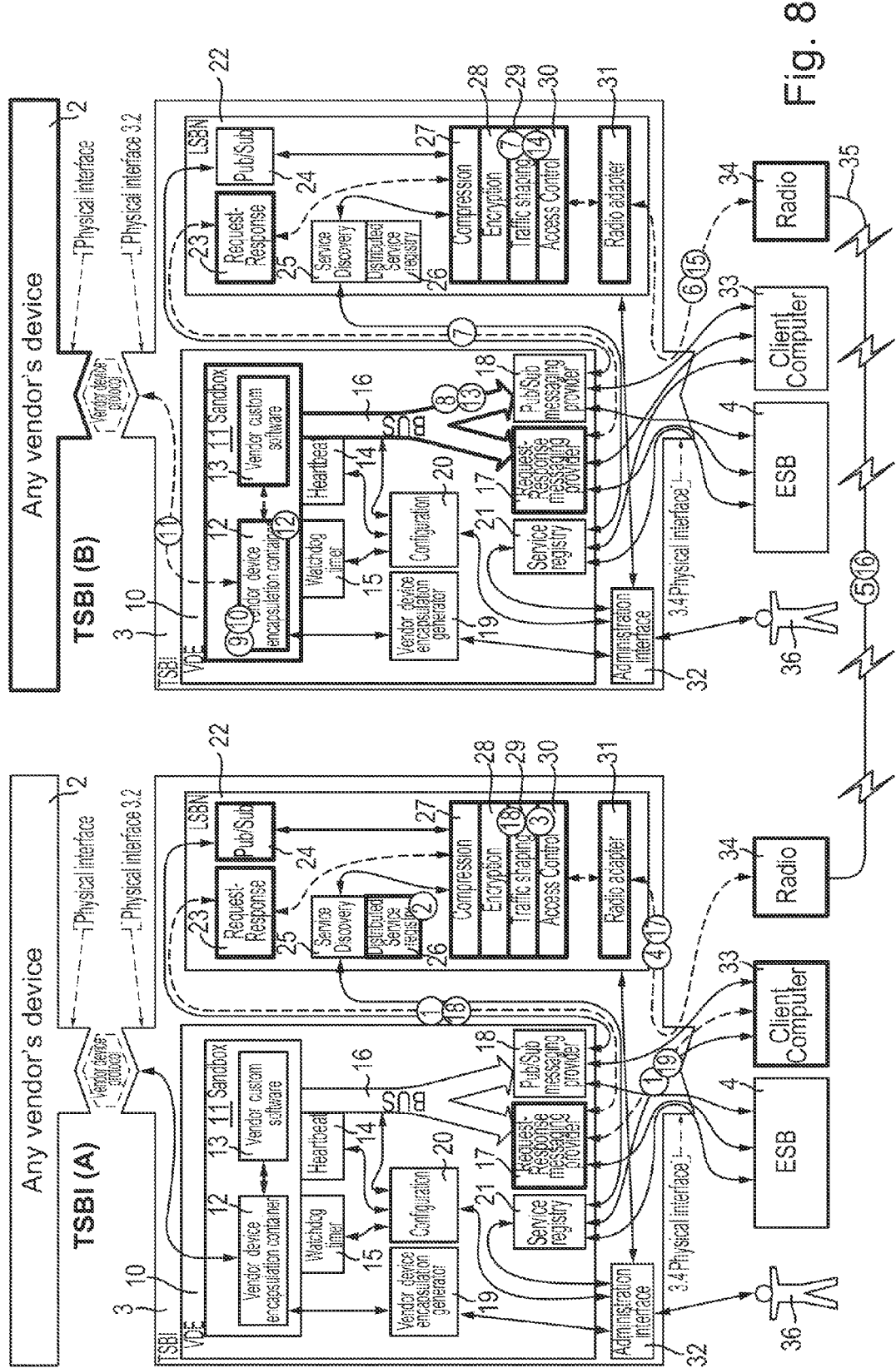
FIG. 8 shows the principle of use of services in an SOA environment via a network with limited bandwidth using the connecting module from FIG. 4.

Finally, with reference to FIG. 8, the use of the services in the SOA environment via a network which is used for military purposes and which is limited in terms of bandwidth, such as the radio network 35, is explained in more detail ("Service Consumption (Request-response) over a constrained technical network"). In this case, the data transmission via the radio network 35 can take place on the basis of an arbitrary protocol or standard. What is crucial is that the bandwidth of the radio network 35 is significantly below the bandwidth of civilian communication networks (Gigabit LAN), for example in the region of just a few mBytes/sec or even in the region of just a few kBytes/sec, particularly in the region of approximately 4 to 20 kBytes/sec and in exceptional cases in a region up to no more than 60 kBytes/sec.

FIG. 8 shows two TSBIs, namely TSBI A (reference symbol 3) and TSBI B (reference symbol 3'). In principle, in FIG. 8, all elements of the first TSBI A are denoted as in the preceding FIGS. 4-7 and the elements of the further TSBI B are accordingly provided with "'". The connecting modules 3, 3' from FIG. 8 each correspond to that shown in FIG. 4. The LSBN 22 of the TSBI A 3 is responsible for services a to c, for example, while the LSBN 22' of the other TSBI B 3' is responsible for services d to f. The LSBNs 22, 22' of the TSBIs 3, 3' in the network shown synchronize themselves to one another so that one TSBI can also access services of the other TSBI and can consume them. In order to save bandwidth, the synchronization does not take place at regular intervals of time. On the contrary, the synchronization is effected, particularly for the purpose of integrating new TSBIs into the network, either upon an express command from a user (i.e. the push of a button and the input of a security code or the like) or during what is known as mission preparation prior to the runtime of the network.

In the course of the synchronization of the TSBIs 3, 3', the services respectively managed in the distributed TSBIs 3, 3' are stored in the service discovery modules 25, 25' of all TSBIs 3, 3', so that each LSBN 22, 22' knows both the services managed by the VDE 10, 10' of its own TSBI 3, 3' and all those managed by the VDEs 10, 10' of the other TSBIs 3, 3' in the network. Thus, by way of example, the service discovery 25' of the TSBI B 3' stores both information about services d to f from the TSBI B 3' and information about services a to c from the other TSBI A 3 in the network.

FIG. 8 additionally indicates a few more method steps by means of numbers in circles. The method steps are executed in rising order and essentially at the location at which they are shown. The method steps from FIG. 8 are independent of the steps in FIGS. 5 to 7 and have nothing to do with them, even though the individual steps have the same numbers in some cases.

In a first step 1, a client computer 33 of the TSBI A sends a SOAP request message to the request-response messaging provider 17 of the TSBI A. In a subsequent step 2, the TSBI A recognizes that the requested service is not localized on itself, but rather on another TSBI B, that is to say that the requested service is provided not by TSBI A but rather by TSBI B. The TSBI B is known to the network and particularly to the TSBI A, since the TSBI B is listed in the distributed service registry 26 of the LSBN 22. In a step 3, the SOAP message is compressed (unit 27) and encrypted (unit 28) and transmitted to the radio adapter 31, which forwards the message to the radio 34 in a step 4.

In a step 5, the message is transmitted from the radio 34 of the TSBI A via the radio network 35 to the radio 34' of the TSBI B. In a step 6, the message enters the radio adapter 31' of the TSBI B. The message is then decrypted and extracted and transmitted to the request-response messaging provider 17' of the TSBI B in a step 7. The message is then transmitted via the bus 16' in a step 8 and arrives in the encapsulation of the sensor 2' ("Vendor Device SOA Encapsulation") 12'. In a step 10, reflection is used to call the suitable service function. In a step 11, the encapsulation 12' of the sensor 2' interacts with the sensor 2'. The output of or by the service function is then converted into a SOAP response message in a step 12. In a step 13, the SOAP message is transmitted via the bus 16' and the request-response messaging provider 17' of the VDE 10' to the LSBN 22', where the SOAP message is compressed, encrypted and transmitted to the radio adapter 31' in a step 14. In a step 15, the radio adapter 31' forwards the SOAP message to the radio 34' of the TSBI B. The SOAP message is transmitted to the radio 34 of the TSBI A via the radio network 35 in a step 16. In a step 17, the SOAP message arrives in the radio adapter 31 of the TSBI A. The LSBN 22 of the TSBI A then decompresses and decrypts the received SOAP message in a step 18 and sends it to the request-response messaging provider 17 of the VDE 10. The SOAP response message leaves the request-response messaging provider 17 and is returned to the client 33.

Figure 9:
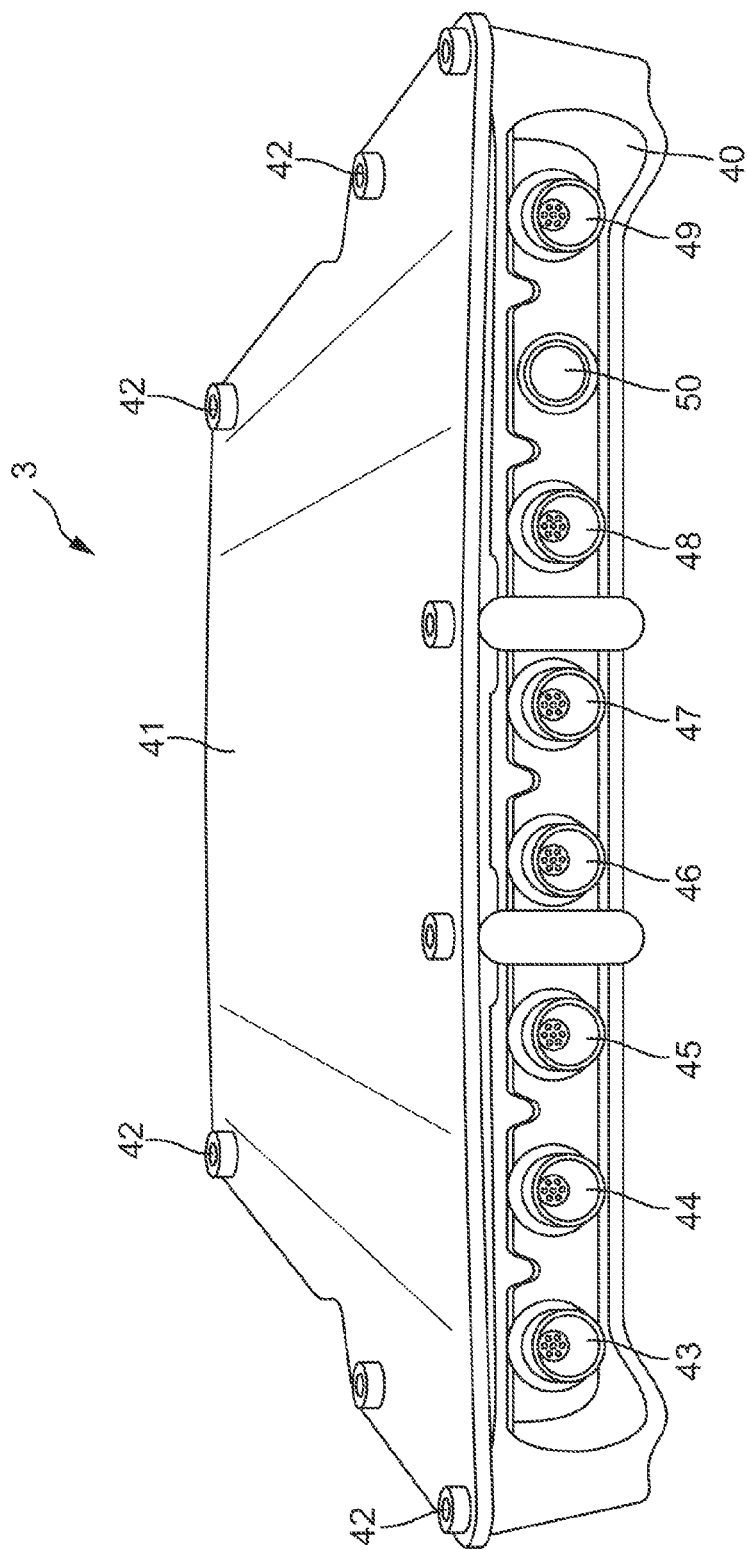
FIG. 9 shows a perspective view of a connecting module according to the invention.

FIG. 9 shows a preferred exemplary embodiment of a TSBI 3 according to the invention. This comprises a housing 40 for holding the electrical components and parts. The housing 40 has an upward opening which is closed by means of a lid 41. The lid 41 is mounted detachably, for example by means of screws 42, on the housing 40. The housing 40 and the lid 41 are preferably made of metal, particularly die cast aluminum. The front of the housing 40 has different connector elements produced on it. In particular, a first Ethernet port 43, a second Ethernet port 44, two USB ports 45, an RS232 port 46, an audio and/or video port 47, a port 48 for VGA and a CAN bus and also a power supply port 49 are provided. A supply voltage of 12 volts is applied to the TSBI 3. In order to start up directly after the TSBI 3 is started, the latter requires a current level of approximately 5 amps, and then only approximately 1 amp. The reference symbol 50 denotes an on/off switch.

The ports 43 to 49 have cables with suitable connectors connected to them which have, at their other end, the usual connector elements (connectors or jacks) for the relevant format, for example a customary Ethernet connector for the ports 43 and 44, two conventional USB connectors for the ports 45, an RS232 connector for the RS232 port 46, audio and video jacks for the port 47, and a VGA connector and also a CAN bus connector for the port 48.

During the encapsulation of a new sensor 2 or for the purpose of managing the TSBI 3, the port 43 or 44 can have a development computer connected to it for generating an encapsulation for the sensor 2 ("vendor device SOA encapsulation"), as is described above with reference to FIG. 5. During the encapsulation of a new sensor 2 or during the intended operation of the TSBI 3, a sensor 2 in the form of a camera may be connected to the port 47, so that audio and/or video signals can be transmitted from the sensor 2 to the TSBI 3. The power supply is connected to the port 49.

In summary, it can be stated that the TSBI 3 is what is known as a convergence module, which can convert arbitrary firmware of the sensors 2 into an SOA compatible standard. The TSBI 3 comprises both hardware components and software components. The aim of the TSBI 3 is to provide simple and complex functionalities as services on the basis of web service standards. The main requirement for the development of the VDE 10 is the encapsulation of appliances and systems ("any vendor's device"), e.g. a sensor 2, which anyone can perform easily, generically and safely. This renders the VDE 10 able to integrate legacy systems, which do not themselves provide a web service interface, into a modern service-oriented architecture. This encapsulation can be performed by the manufacturer (vendor) of the appliance 2 that is to be encapsulated itself. The automatic mechanisms and tools of the VDE 10 assist the manufacturer in this action. The VDE infrastructure 10 adapts the SOA mechanisms to existing programming languages such that the manufacturer does not require any knowledge about web service interfaces (WSDL) for the encapsulation.

The present invention thus allows encapsulation of arbitrary appliances 2 without know-how about web services. The encapsulation of the functions of an appliance (e.g. rotating, zooming, etc.) for the services thereof does not require the manufacturer to have knowledge about web service interfaces. The VDE 10 internally generates the WSDL suitable for the bus 4/client 33 and the interface suitable for the appliance 2. Furthermore, the manufacturer is provided with a C++ template, in which it can perform hardware-specific customizations. For an encapsulation with the TSBI, the sensor manufacturer (vendor) does not need to disclose its interface, which can significantly improve the acceptance of the invention by the manufacturers.

What are known as the reflections with C++ ("pointer to operation") allow information about classes or the instances thereof, for example, to be retrieved for object-oriented programming. This may be, inter alia, the visibility of said classes or instances, the data type of the return value or the type of the transfer parameters. The implementation of the query options is language specific. In C++, the associated memory address needs to be found at the correct time at runtime so that the function can be called. Readable C++ code is converted into pure memory addresses following compellation.

In order to be able to manage the manufacturer information and the services in different versions (c.f. FIG. 5, step 4), the VDE 10 has a repository which is used to store all service descriptions. Backward compatibility by versioning when new software versions are used needs to be ensured.

Every VDE 10 brings along its own repository. There is no central node as an "Achilles' heel" on which the data are situated and which could fail. The local, distributed architecture means that a TSBI network can be shattered only with difficulty. A first TSBI A can access the functionality of a second TSBI B via a radio network 35 (cf. FIG. 8).

The appliances 2 which are encapsulated by the VDE need to be triggered in order to perform an action or they need to know their last status. Web services which—after they have been performed once—are erased or forget their status again are therefore not suitable for direct communication with legacy appliances. Web service calls are usually received simultaneously, i.e. in large numbers. An appliance processes calls sequentially, however. As a result, a fresh call during the execution of a call which has already been accepted would be lost. The VDE 10 solves this problem by buffer-storing the service calls received via the request-response module 17 at least until they can be executed. The module 17 also ensures that the incoming calls are executed in the correct order. If the incoming service calls have associated priorities, the module 17 can likewise take these into account when stipulating the order of execution.

Errors which arise in the VDE 10 are output by the VDE 10 as "SOAP errors" (error message). This applies particularly to the software components which are imported into the VDE 10 by the manufacturers. This ensures that an error is recognized so that it is immediately possible to take appropriate countermeasures. This thus means that errors in the encapsulated appliance 2 can appear as SOAP errors and be recognized. The sandbox 11 isolates the appliances 2 in the VDE 10 completely. This increases security and at the same time availability, since the isolated appliances 2 can be attacked only with difficulty. In addition, the watchdog timer 15 is used to ensure that the appliances 2 and also the sandbox 11 itself are available. To this end, the encapsulation of an appliance 2 sends a heartbeat message to the watchdog 15 at prescribed times, preferably regularly. If there is a system crash, the sandbox 11 is automatically restarted. "Freezing" of the system is therefore ruled out. The VDE 10 allows the user 36 to easily connect to different service buses 4. The VDE 10 cooperates with all standard service buses 4 on the market without difficulty. In this case, the TSBI 3 learns what service bus 4 is involved at the push of a button. It is thus a simple matter for the appliances 2 to be coupled to various domains. The adaptive service bus interface ensures interoperability at the highest level.

The services generated by the connecting module 3 and corresponding to one or more functions of the encapsulated appliance 2 can be addressed by any other nodes in the SOA network. So that a node is able to call and consume a service, it is not necessary—unlike in the prior art, for example US 2007/0236346 A1—for software to be transmitted from the connecting module 3 to the calling node, stored thereon and executed. The calling of the services and the communication of the nodes in the SOA environment with the connecting module 3 take place only via the web service interface 17 (request-response) and via the pub/sub interface 18 (subscribe/publish). In US 2007/0236346 A1, service firmware is transmitted from one node to other nodes so that said nodes can communicate with one another.

However, this does not rule out the connecting module 3 according to the invention involving the possible transmission of an export file generated by the VDE 10 to other connecting modules 3 or other VDEs 10 in order to encapsulate the same appliances 2 thereon. It is thus possible for the encapsulation produced for an appliance 2 to be transmitted to other VDEs 10, so that appliances of the same type as the appliance 2 can be encapsulated thereon with minimum complexity.

In one exemplary embodiment, in which the TSBI 3 is connected to an ESB 4, the firmware of the TSBI 3 does not transmit the service to the network automatically. On the contrary, the service descriptions need to be installed in the service registry of the ESB 4. The ESB 4 knows that a particular service is available by virtue of its receiving the heartbeat notifications of the service. The service itself is—unlike in US 2007/0236346 A1, for example—never transmitted between the nodes, but rather is consumed remotely by means of SOAP.

If the TSBI 3 is being used in a military environment, it can use the LSBN 22. Unlike in US 2007/0236346 A1, there is no central platform or unit which observes or supervises the connection of new appliances. The LSB is a completely distributed service bus for military use which synchronizes itself to the other nodes. Neither drivers nor services are transmitted from one TSBI 3 to another TSBI 3' via the LSB. The LSBN 22 merely installs service maps (representations), for example in the WSDL, upon request, and services are consumed by means of remote procedure calls (SOAP).

The present invention will be explained in more detail with reference to FIG. 10. FIG. 10 shows a TSBI 3, an appliance 2 to be encapsulated, which is inherently without SOA capability, and a client 36 which wishes to access the appliance 2 from the SOA environment. By way of example, the appliance 2 is a movable camera or a moveable weapons system. A first function Fct1 of the appliance 2 corresponds to swiveling and a second function Fct2 corresponds to tilting of the camera or the weapon, for example. In the case of a camera, a third function Fct3 could be a function for confirming the swivel or tilt movement which has taken place, for example. In the case of a weapon, the third function Fct3 could be a function for firing the weapon, for example.

It goes without saying that the appliance 2 may also have more or fewer functions or functions other than the three functions Fct1 to Fct3 shown. These functions can be called by at least one physical interface 60 and can be called using an API (Application Programming Interface) delivered by the manufacturer, a software module delivered by the manufacturer or a protocol defined by the manufacturer. The design and manner of operation of the appliance-specific software interfaces are known exclusively to the manufacturer of the appliance 2. The individual functions Fct1 to Fct3 are implemented by program code which is executed on a computation appliance, for example a processor, of the appliance 2. The program code is illustrated in FIG. 10 by commands c1, c2, c3, ... that are to be executed, and is denoted in its entirety by the reference symbol 61. The program code 61 is normally proprietary, frequently programmed in the programming language C++ and known only to the manufacturer of the appliance 2.

During conventional, unencapsulated operation of the appliance 2, without SOA capability, the appliance 2 is actuated with commands, for example from a computer or a joystick, via the interface 60. This involves calls, possibly with particular transfer parameters, being sent to the interface 60 of the function Fct1 to Fct3 that is to be performed. By way of example, a call could be: "Swivel through 45°", in which case the first function Fct1 is called and 45° is a transfer parameter for the function Fct1. Depending on the function to be performed, it returns a result or else not. By way of example, the function Fct1 can return a result to report successful swiveling of the appliance 2. Alternatively, it would also be conceivable for a separate function, for example the function Fct3, to be provided in order to report successful swiveling and/or tilting of the appliance 2. The function Fct3 is called after the function Fct1, for example without a transfer parameter. As a return parameter, the function Fct3 can return a Boolean value ("1" or "0") in order to signal that swiveling or tilting of the appliance 2 has been successful or has taken place.

The TSBI 3 comprises a frame structure 62 which is generated automatically using specifications from the manufacturer of the appliance 2. By way of example, the manufacturer specifies which function(s) from the functions Fct1 to Fct3 of the appliance 2 it wishes to encapsulate and whether, and if so which, parameters (input variables, output variables) are expected or returned by the functions that are to be encapsulated. If, in the example in FIG. 10, the first function Fct1 is intended to be encapsulated, the manufacturer of the appliance 2 prescribes the "swivel" function, as an end parameter an angle size (e.g. of integer type) for movement of the appliance 2, and as an output parameter a yes/no statement (e.g. of Boolean type) as information about whether the swiveling was successful, i.e. whether the desired end point has been reached. The manufacturer can prescribe corresponding parameters for the "Tilt" function Fct2. For the function Fct3, in the case of a camera, the manufacturer can prescribe "Check movement" as the function to be encapsulated, no input parameters and, as output parameter, a yes/no statement (e.g. of Boolean type) for whether the swiveling/tilting was successful, for example.

The functions and parameters prescribed by the manufacturer of the appliance 2 are used to automatically generate the frame structure 62 of the TSBI 3. The administration interface 32 (cf. FIGS. 4 to 8) of the TSBI 3 is used for defining the framework or the frame structure 62. The frame structure 62 is then generated by the vendor device encapsulation generator 19 in the VDU 10. The frame structure 62 also comprises inputs 63 and outputs 64, defined by the manufacturer, for the input and output parameters of the encapsulated functions Fct1 to Fct3. The inputs 63 and outputs 64 may be implemented by what is known as an Admin GUI (Graphical User Interface), for example.

In order to implement the encapsulation of one of the functions Fct1 to Fct3 of the appliance 2, the program code 61 of the relevant function needs to be stored in or incorporated into the frame structure 62 at a prescribed location of the frame structure 62. By way of example, the frame structure 62 stores the program code 61' (c1, . . . ) of the second function Fct2 of the appliance 2 for the function Fct2. The program code 61' stored in the frame structure 62 corresponds to the vendor custom software block 13 in the sandbox 11 of the TSBI from FIGS. 4 to 8. This protects the know how of the manufacturer in the form of the program code 61 of the appliance 2 against unauthorized access by third parties.

Instead of the actual program code 61', the manufacturer of the appliance 2 can also simply store or program references to the program code 61 in the appliance 2 in the frame structure 62 at the prescribed location of the frame structure 62. By way of example, the reference comprises a call 65 and a program code for acceptance of a result 66. Such a call 65 is shown as an example for the encapsulation of the first function Fct1 in the frame structure 62 in FIG. 10. Similarly, the program code is programmed for acceptance of a result 66 for the first function Fct1. The call to the program code 61 of the first function Fct1 of the appliance 2 is illustrated by an arrow—shown with a solid line—from the TSBI 3 to the interface 60 of the first function Fct1 of the appliance 2. Similarly, the return of the result from the function Fct1 is illustrated by an arrow—shown with a solid line—from the interface 60 of the first function Fct1 of the appliance 2 to the TSBI 3.

If the function Fct1 of the appliance 2 is such that it does not return a result, the program code 66 can also be dispensed with instead of the function Fct1 in the frame structure 62. Instead, for example after the call 65 to the first function Fct1 of the appliance 2, another function of the appliance 2, for example the function Fct3, could be called in order to check whether the swivel movement by the appliance 2 performed as a result of execution of the program code 61 of the first function Fct1 has been successfully concluded. As the result, the function Fct3 returns a piece of information concerning whether the desired aim of the swivel movement has been achieved (e.g. a Boolean value). The call to the third function Fct3 is illustrated in FIG. 10 by an arrow—shown with a dashed line—from the TSBI 3 to the API 60 of the third function Fct3 of the appliance 2. Similarly, the return of the result of the function Fct3 is illustrated by an arrow—shown with a dashed line—from the interface 60 of the third function Fct3 of the appliance 2 to the TSBI 3.

Finally, it would also be conceivable for the TSBI 3 to map not only functions Fct1 to Fct3 of the appliance 2 but also other functions, for example executed merely on a separate computer 67, particularly a PC, arranged outside the appliance, in an SOA environment by means of the TSBI 3. In this case, it is conceivable either for program code from the computer 67 to be copied directly to the frame structure 62 or programmed therein (vendor custom software 13) or merely for references to the program code of the computer 67 to be stored in the frame structure 62. It is conceivable for the computer 67 to be connected to the appliance 2 by means of a data transmission link (not shown), so that execution of the program code on the computer 67 can trigger an appropriate action or function of the appliance 2 or process return values from the appliance 2. In this way, it is also possible to encapsulate not only individual functions of the appliance 2 or of external computers 67 but also complex systems for implementing a plurality of functions.

When the functions Fct1 to Fct3 of the appliance 2 have been encapsulated, a client 36 from the SOA environment can use SOA calls (e.g. Request) to access the encapsulated functions Fct1 to Fct3 or receive and process acknowledgements from the functions (e.g. Response) in the SOA environment. By way of example, FIG. 10 shows a request 68 from the client 36 to the encapsulated first function Fct1. The request 68 may comprise one or more transfer parameters, for example an angle statement for the swivel movement in the case of the "Swivel" function. Similarly, a response 69 from the encapsulated first function Fct1 to the client 36 is shown. The response 69 may also comprise one or more return parameters, for example a piece of information concerning whether the swivel movement was successful in the case of the "Swivel" function. If no parameters are transferred, the relevant field of the SOA call 68, 69 is simply left blank.

The TSBI 3 "translates" the SOA call into a format which is comprehensible to the appliance 2 or compatible with the program code stored therein. This is accomplished by the algorithms prescribed by the manufacturer of the TSBI 3. The manufacturer of the appliance 2 which carries out the appliance-specific programming of the TSBI 3 does not need to have any kind of knowledge about web services and the SOA world. Furthermore, the execution of a plurality of SOA calls 68 in the TSBI 3 or in the appliance 2 is coordinated by the TSBI 3. In particular, any priorities associated with the SOA calls 68 for the calls 68 can be translated into the proprietary appliance-specific environment and taken into account therein. Taking priorities into account is important because otherwise, using the example of an appliance 2 in the form of a camera, the third function Fct3 delivers an incorrect result for the success of the swivel or tilt movement if the first or second function Fct1 or Fct2 is not executed completely first of all. Using the example of an appliance 2 in the form of a weapon, the third function would result in the weapon being triggered even though the final position of the swivel or tilt movement has not yet been reached.

The invention claimed is:

1. A connecting module for connecting at least one appliance to a network, comprising:
  at least one first interface for connecting the at least one appliance;
  at least one second interface for connecting the network, and
  a computation appliance for executing a computer program, wherein one portion of the computer program is prescribed and only a second portion of the computer program is freely programmable by a manufacturer of the at least one appliance;
  characterized in that the network is a service-oriented architecture, termed SOA network, wherein a functionality of the at least one appliance is mapped as a service in the SOA network, and programming by the manufacturer is for customization of a piece of firmware which is present on the at least one appliance without any knowledge about SOA, a statefulness of the appliance, a statelessness of the service in the SOA environment of the SOA network and allowance for the service, in order to maintain security of the appliance.

2. The connecting module as claimed in claim 1, characterized in that the appliance to be connected to the SOA network comprises a sensor, effector or actuator.

3. The connecting module as claimed in claim 1, characterized in that the first interface comprises an RS232 interface, a USB interface, a LAN connection, an Ethernet connection or an optical connection.

4. The connecting module as claimed in claim 1, characterized in that the second interface comprises a bus connection, particularly a CAN, TTCAN, LIN, MOST, ByteFlight, D2B Optical or FlexRay bus connection.

5. The connecting module as claimed in claim 1, characterized in that the second interface is in the form of a radio interface.

6. The connecting module as claimed in claim 4, characterized in that the radio interface is designed for data transmission between the connecting module and the SOA network with a short delay time, particularly in realtime.

7. The connecting module as claimed in claim 1, characterized in that the computation appliance designed to execute the computer program is a microprocessor.

8. The connecting module as claimed in claim 1, characterized in that the computation appliance designed to execute the computer program is a digital signal processor, termed DSP.

9. The connecting module as claimed in claim 1, characterized in that the computation appliance controls the first and/or the second interface.

10. The connecting module as claimed in claim 1, characterized in that the computation appliance does not actuate the first and/or the second interface and in that the connecting module has a further computation appliance, particularly a digital signal processor, termed DSP, which controls the first and/or the second interface.

11. The connecting module as claimed in claim 1, characterized in that the connecting module has a watchdog timer.

12. The connecting module as claimed in claim 1, characterized in that the customization of the firmware which is present on the at least one appliance to the SOA network involves automatic production and implementation of a heartbeat operation.

13. The connecting module as claimed in claim 1, characterized in that the connecting module stores and effects coordinated execution of SOA calls from the SOA network.

14. The connecting module as claimed in claim 1, characterized in that the firmware which is present on the at least one appliance is customized to the SOA network by the appliance manufacturer using knowledge by the appliance manufacturer about interfaces of the appliance to be encapsulated and about a programming language for an encapsulation framework for the firmware, which encapsulation framework is generated as part of the customization.

15. The connecting module as claimed in claim 1, characterized in that SOA encapsulation of a functionality of the appliance is implemented such that the SOA encapsulation processes priorities for SOA calls from the SOA network such that the functionalities of the appliance which correspond to the SOA calls can be executed in an order which corresponds to the priorities.

16. The connecting module as claimed in claim 1, characterized in that the connecting module has a sandbox which is separate from the other components of the connecting module and which stores the customizations of the appliances to the SOA network.

17. The connecting module as claimed in claim 1, characterized in that the customizations of the appliances to the SOA network are implemented by service descriptions which are stored in a service registry of the connecting module.

18. The connecting module as claimed in claim 17, characterized in that the service registry delivers a suitable WSDL (Web-Service Definition Language) file for various SOA networks.

* * * * *